(12) United States Patent  (10) Patent No.: US 7,861,080 B2
Wakameda  (45) Date of Patent: Dec. 28, 2010

(54) PACKET COMMUNICATION SYSTEM

(75) Inventor: Hiroshi Wakameda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 970 days.

(21) Appl. No.: 11/700,782

(22) Filed: Feb. 1, 2007

(65) Prior Publication Data

US 2007/0186100 A1 Aug. 9, 2007

(30) Foreign Application Priority Data

Feb. 3, 2006 (JP) .............................. 2006-027726

(51) Int. Cl.
*H04L 29/06* (2006.01)
*G06F 15/173* (2006.01)
(52) U.S. Cl. ...................... 713/160; 709/223; 709/224; 709/238
(58) Field of Classification Search .................. 713/160
See application file for complete search history.

(56) References Cited

U.S. PATENT DOCUMENTS 6,574,214 B1* 6/2003 Khalil et al. ................. 370/349
7,215,667 B1* 5/2007 Davis .......................... 370/389

OTHER PUBLICATIONS

Patent Abstracts of Japan, Publication No. 2004-140539, Published May 13, 2004.
Patent Abstracts of Japan, Publication No. 2005-086223, Published Mar. 31, 2005.

* cited by examiner

*Primary Examiner*—Shin-Hon Chen
(74) *Attorney, Agent, or Firm*—Fujitsu Patent Center

(57) ABSTRACT

A packet communication system for effectively using network resources and for improving network operability. A transmission security policy database specifies the omission of header information attached when a transmission packet is capsulated, as a transmission security policy. A header-information omitting section omits the header information of the capsulated transmission packet. A packet transmission processing section adds a security header and a header for tunnel communication to the packet from which the header information has been omitted and transmits the packet. A receiving security policy database specifies that the header information has been omitted, as a receiving security policy. A header-information recovering section searches the receiving security policy database for a security policy for a received packet, and when recognizing that the received packet is a target packet from which the header information has been omitted, recovers the header information.

11 Claims, 33 Drawing Sheets

11a SPD

| TRANS-MISSION OR RE-CEIVING | TRANS-MISSION SOURCE IP ADDRESS | TRANS-MISSION SOURCE IP NET MASK | DESTI-NATION IP ADDRESS | DESTI-NATION IP NET MASK | MODE | TUNNEL TRANSMISSION SOURCE IP ADDRESS | TUNNEL DESTI-NATION IP ADDRESS | PROTOCOL | SPI | HEADER OMISSION |
|---|---|---|---|---|---|---|---|---|---|---|
| TRANS-MISSION | CoA | | HA | 32 | Tunnel | PHY | VPN GW | AH | 1032 | ON |
| RE-CEIVING | HA | | CoA | 32 | Tunnel | VPN GW | PHY | AH | 5312 | ON |

FIG. 25

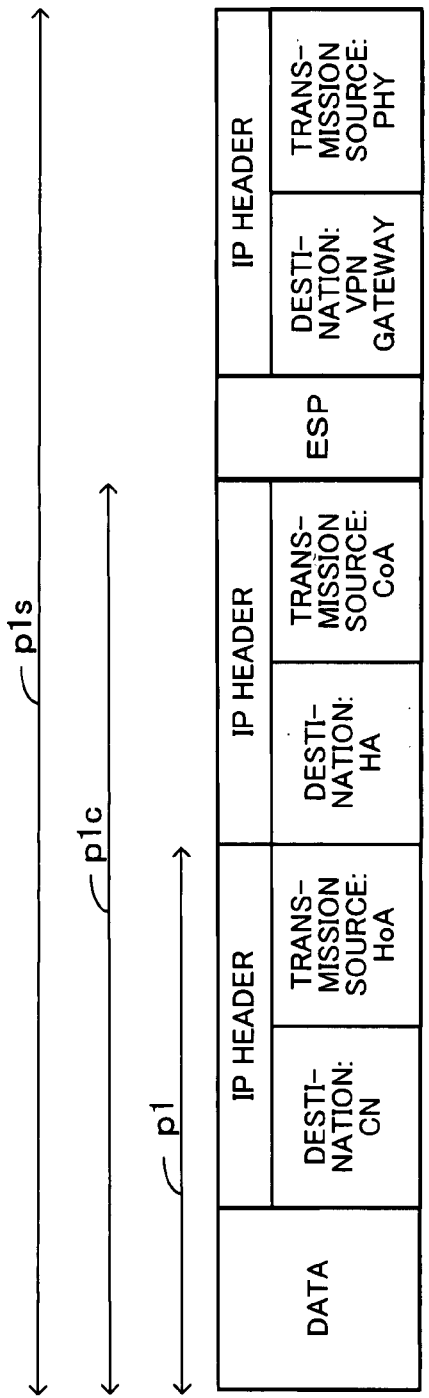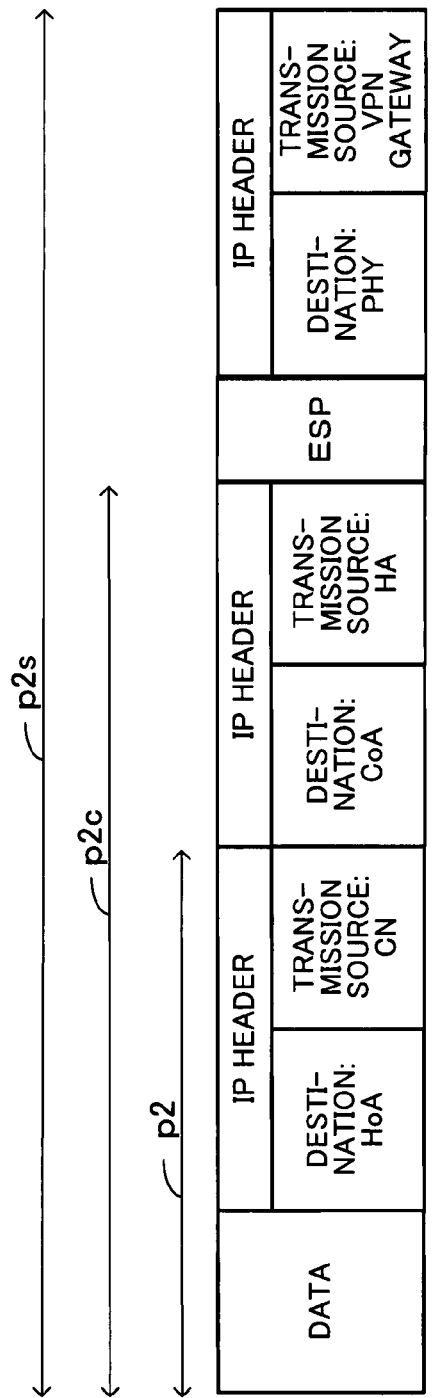
FIG. 33A
FIG. 33B

PACKET COMMUNICATION SYSTEM

CROSS-REFERENCE TO RELATED APPLICATIONS

This application is based upon and claims the benefits of priority from the prior Japanese Patent Application No. 2006-027726, filed on Feb. 3, 2006, the entire contents of which are incorporated herein by reference.

BACKGROUND OF THE INVENTION

1. Field of the Invention

The present invention relates to packet communication systems, and particularly to a packet communication system that performs packet communication by using a mobile virtual private network (VPN).

2. Description of the Related Art

In Internet Protocol (IP) communication, an IP address is assigned to each terminal. When a terminal is moved to a different network, a different IP address is assigned thereto, and the terminal cannot continue communication performed before the movement. Mobile IP has been developed as a technology that allows IP communication to be continued even if a terminal is moved to a different network.

The mobile IP is a technology that conceals from layers higher than the IP layer the fact that a terminal has been moved and shows the terminal to the communication destination as if the terminal were not moved to allow the movement while the communication is being performed with the destination. Mobile IPs that support movement in the IP layer includes Mobile IPv4 and Mobile IPv6.

As the mobile IP has advanced, a demand for more convenient remote access has been increasing. To satisfy the demand, a virtual private network (VPN) technology has been implemented. VPNs are private communication networks virtually configured by connecting points through public networks such as the Internet, and allow communications with private IP addresses.

IP addresses in the Internet for packets are divided into two types: global IP addresses unique in the world and private IP addresses used in private networks shared in companies and homes.

To enable communication in the Internet, both parties need to have global IP addresses. Usually in companies, however, global IP addresses are assigned to a minimum number of units, such as a router and a web server, and private IP addresses are used in an in-house LAN.

Therefore, it is usually impossible to access a terminal on an in-house LAN through the Internet from a point outside the LAN, but since VPNs allow communication to be made between terminals having private IP addresses, communication can be made between intranets as if they were in the same private network, and remote access can be implemented from a house or from the destination of a business trip to the in-house LAN.

Unlike leased lines, VPNs have risks of sniffing (reading the content of data furtively), tampering (altering the content of data), and impersonation (a third party pretending to be an authorized user to be active on a network) and other risks because communication is made through networks having low security levels, (in the case of Internet VPNs, because communication is made through the Internet, which has a low security level). Security is one of the most important issues. VPNs use encrypted communication called an IP security architecture (IPsec) to avoid the risks.

IPsec provides IP packets themselves with concealment, and performs access control with packet information guaranteed, to implement a high security level in units of IP packets, not for a specific application. IPsec can protect various applications without any needs to provide a security function unique to each application, unlike Pretty Good Privacy (PGP) for email communication and Secure Socket Layer (SSL) for WWW communication.

Applications that use higher protocols such as Transmission Control Protocol (TCP) and User Datagram Protocol (UDP) can use IPsec without being aware of its use and can maintain the same security level as for leased lines, at a low cost.

As described above, Mobile IP provides mobility with which one IP address can be accessed from anywhere on IP networks, and VPNs with IPsec allow mutual communication to be performed at a high security level.

Recently, a mobile VPN technology has been researched and developed, in which Mobile IP and a VPN are combined to provide both mobility and a high security level. In a mobile VPN, Mobile IP is registered as a terminal is moved, and the VPN is updated at the same time. This technology attracts attention as a core technology of remote access systems in the ubiquitous era.

First, mobile VPNs had technical issues such as a relationship with network address translation (NAT) and satisfaction of both security matching and seamless communication at handover. These issues have been being solved by technical specifications such as RFC 3456, RFC 3947, RFC 3948, and draft-ietf-mip4-vpn-problem-solution-01 of Internet Engineering Task Force (IETF).

As a conventional technology related to mobile VPNs, a network technology in which a relay apparatus holds a routing table for searching the header for the destination address to accommodate a radio terminal has been proposed (for example, see paragraph Nos. [0027] to [0048] and FIG. 1 in Japanese Unexamined Patent Application Publication No. 2005-86223).

In a conventional mobile VPN system (for example, in a system indicated by the above draft-ietf-mip4-vpn-problem-solution-01), however, packet capsulation (a distribution header is added to a packet to capsulate the packet) transmission caused by Mobile IP and further capsulation caused by IPsec in tunnel mode when the VPN is configured trebly capsulate an IP packet to make the data size larger and make the network bandwidth tight.

The conventional problems will be described below in detail. First, an outline operation of Mobile IP, which is the base of a mobile VPN, will be described, and then the problems of the conventional VPN will be specifically explained.

FIG. 30 shows an example structure of a Mobile-IP network. FIG. 31A indicates the format of a packet sent from a mobile node, and FIG. 31B indicates the format of a packet sent from a home agent.

In the Mobile-IP network, a home network 51, a visitor-location network 52, and a communication terminal 6 are connected through the Internet 53.

A mobile node MN (MN: mobile node) usually belongs to the home network 51, and has a fixed IP address called a home address (HoA). In the home network 51, a home agent 5 for managing the position of the mobile node MN is disposed.

It is assumed here that the IP address of the home agent 5 is HA (home agent), and the IP address of the communication terminal 6, which is a fixed unit, is CN (CN: correspondent node).

Step S51: The mobile node MN moves from the home network 51 to the visitor-location network 52 to change the connection destination.

Step S52: The mobile node MN obtains a temporary IP address used in the movement-destination network by using Dynamic Host Configuration Protocol (DHCP: protocol that automatically assigns necessary information such as an IP address to a computer temporarily connecting to the Internet) or the like. This temporary IP address is called a care-of address (CoA).

Step S53: The mobile node MN sends a position registration message that associates HoA and CoA, to the home agent 5.

Step S54: The home agent 5 receives the position registration message and registers the position with the relationship between HoA and CoA being held.

Step S55: When the mobile node MN sends a packet to the communication terminal 6, the mobile node MN generates a packet p1 having a header in which the destination is set to CN and the transmission source is set to HoA, as shown in FIG. 31A. Since the packet is sent through the home agent 5, the mobile node MN adds an IP header in which the destination is set to HA and the transmission source is set to CoA to the original packet p1 to generate a packet p1c, as shown in FIG. 31A, and sends the packet p1c to the home agent 5.

Step S56: The home agent 5 receives the packet p1c and decapsulate it to take out the packet p1. Since it is understood from the header information of the packet p1 that the destination is CN, the home agent 5 sends the packet p1 to the communication terminal 6.

Step S57: When the communication terminal 6 sends a packet to the mobile node MN, the communication terminal 6 generates a packet p2 having a header in which the destination is set to HoA and the transmission source is set to CN, as shown in FIG. 31B, and sends it to the Internet 53.

Step S58: The home agent 5 intercepts the packet p2 to be sent to the mobile node MN (destination HoA), and recognizes CoA, held at position registration, from HoA. The home agent 5 adds a header in which the destination is set to CoA and the transmission source is set to HA to the packet p2 to generate a packet p2c, as shown in FIG. 31B, and sends the packet p2c to the mobile node MN through the Internet 53.

Step S59: The mobile node MN receives the packet p2c, and decapsulates it to take out the packet p2.

As described above, since the home agent 5 holds the relationship between HoA and CoA and performs proxy reception of a packet sent to the mobile node MN, the communication terminal 6 can send a packet always to HoA without being aware of the movement of the mobile node MN. The mobile node MN can receive the packet even at the movement destination.

A general specification of Mobile IPv4 defines a system where the visitor-location network 52 serves as a foreign network, a foreign agent is disposed in the foreign network, and the foreign agent assigns CoAs to a plurality of mobile nodes MN and decapsulates a packet sent to a mobile node MN. When the functions of the foreign agent are provided for a mobile node MN, a network which does not need to have a special node such as the foreign agent can be configured (in Mobile IPv6, the foreign agent is unnecessary). In the above description, DHCP is used to obtain CoA. When a mobile node MN itself has an automatic address generation function, a unit having a special protocol such as DHCP is also unnecessary.

The structure of a mobile VPN will be described next. FIG. 32 shows an example structure of a mobile VPN. FIG. 33A and FIG. 33B show packet formats used in the mobile VPN.

The mobile VPN differs from the Mobile-IP network described above with reference to FIG. 30 in that the mobile VPN further includes a VPN gateway 7 and a mobile node MN has the IPsec function.

The VPN gateway 7 is a termination unit disposed at a point where encryption is made in a communication path, for generating a state in which a connection is made by a virtual private line, that is, a VPN. In the figure, the VPN gateway 7 is disposed between a home agent 5 and the Internet 53 to make a VPN serving as a encryption communication path between a mobile node MN and the VPN gateway 7 to implement safe communications even in the Internet.

When such a VPN is configured, encryption tunneling is performed in which a new header is added to a packet to be protected to generate another packet and the whole of the other packet serving as a communication target is protected to allow communication between networks having different protocols or address systems.

When the mobile node MN sends a packet, a packet p1c is encrypted; the whole of the encrypted packet p1c is capsulated, for example, with an encapsulating security payload (ESP) header; and a new IP header for tunnel communication is added to generate and send a packet p1s shown in FIG. 33A. In the new IP header for tunnel communication, the destination is set to the IP address of the VPN gateway 7 and the transmission source is set to a PHY address (physical address in the visitor-location network 52).

When the VPN gateway 7 sends a packet, a packet p2c is encrypted; the whole of the encrypted packet p2c is capsulated, for example, with an ESP header; and a new IP header for tunnel communication is added to generate and send a packet p2s shown in FIG. 33B. In the new IP header for tunnel communication, the destination is set to the PHY address and the transmission source is set to the IP address of the VPN gateway 7.

As described above, since the original IP packet is capsulated by Mobile IP with an IP header being added, and further capsulated by IPsec tunneling, the packet format of a conventional mobile VPN has triple capsulation.

Because redundant IP headers are added, the size of data to be actually exchanged between the networks becomes larger than the size of the original data which the users want to exchange, causing the network bandwidth tight.

Especially since radio LAN networks typical of which is IEEE 802.11b, which is generally used currently, and portable telephone networks such as wide code division multiple access (W-CDMA) have narrow network bandwidths, when IP headers are multiplexed to make the size of an IP packet to be exchanged large, a very large load is imposed on the networks to reduce network operability.

SUMMARY OF THE INVENTION

In view of the foregoing, the present invention has been made. An object of the present invention is to provide a packet communication system that omits a redundant header of a packet in communication in a mobile VPN to effectively use network resources while seamless communication and a high security level are both satisfied.

To accomplish the above object, according to the present invention, there is provided a packet communication system for performing packet communication. This packet communication system includes a packet transmission apparatus and a packet receiving apparatus. The packet transmission apparatus includes a transmission security policy database for storing a security policy indicating a level of protection applied to a packet, specifying the omission of header information attached when a transmission packet is capsulated, as a transmission security policy for omitting redundant information; a header-information omitting section for searching the transmission security policy database at packet transmission for a security policy for a capsulated transmission packet, and, when recognizing that the capsulated transmission packet is a target packet from which the header information is to be omitted, for omitting the header information from the target packet; and a packet transmission processing section for adding a security header by tunneling in an encryption protocol and a header for tunnel communication to the packet from which the header information has been omitted, and for applying transmission processing to the packet. The packet receiving apparatus includes a receiving security policy database specifying the header information, which is to be recovered, as a receiving security policy; and a header-information recovering section for searching the receiving security policy database at packet reception for a security policy for a received packet, and, when recognizing that the received packet is a target packet from which the header information has been omitted, for recovering the header information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 25 shows an example structure of an SPD.
FIG. 33A shows the format of a Mobile-VPN packet sent from the mobile node,
and FIG. 33B shows the format of a Mobile-IP packet sent from the VPN gateway.

DESCRIPTION OF THE PREFERRED EMBODIMENTS

Figure 1:
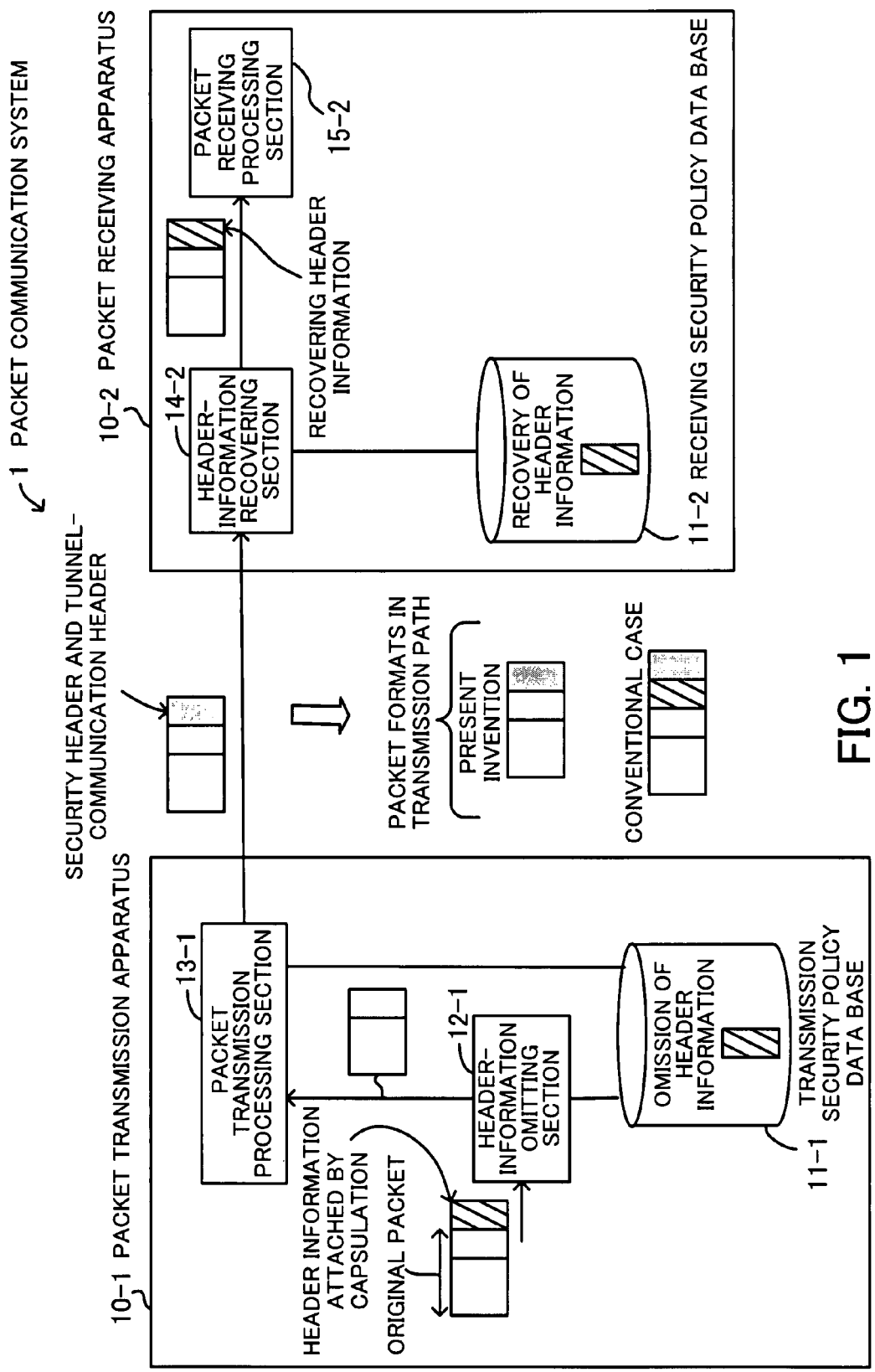
FIG. 1 is a view showing the principle of a packet communication system.

Embodiments of the present invention will be described below by referring to the drawings.

FIG. 1 is a view showing the concept of a packet communication system 1. The packet communication system 1 is formed of a packet transmission apparatus 10-1 and a packet receiving apparatus 10-2, and performs packet communication. For ease of description, the transmission apparatus and the receiving apparatus are separately provided. Actually, both of the functions of the packet transmission apparatus 10-1 and the packet receiving apparatus 10-2 are included in a single packet communication apparatus.

The packet transmission apparatus 10-1 is formed of a transmission security policy database 11-1, a header-information omitting section 12-1, and a packet transmission processing section 13-1. The transmission security policy database 11-1 stores a security policy indicating a level of protection applied to a packet and specifies the omission of header information attached when a transmission packet is capsulated, as a transmission security policy for omitting redundant information.

The header-information omitting section 12-1 searches the transmission security policy database 11-1 for a security policy for a capsulated transmission packet when the packet is sent. When the header-information omitting section 12-1 recognizes that the packet is a target packet from which the header information is to be omitted, the header-information omitting section 12-1 omits the header information from the target packet.

The packet transmission processing section 13-1 adds a security header by tunneling in encryption protocol and a tunnel-communication header to the packet from which the header information has been omitted, and performs packet transmission processing.

The packet receiving apparatus 10-2 is formed of a receiving security policy database 11-2, a header-information recovering section 14-2, and a packet receiving processing section 15-2. The receiving security policy database 11-2 specifies that the header information has been omitted, as a receiving security policy.

The header-information recovering section 14-2 searches the receiving security policy database 11-2 for a security policy for a received packet when the packet is received.

When the header-information recovering section 14-2 recognizes that the packet is a target packet from which the header information has been omitted, the header-information recovering section 14-2 recovers the header information. The packet receiving processing section 15-2 performs receiving processing for the packet in which the header information has been recovered.

Figure 2:
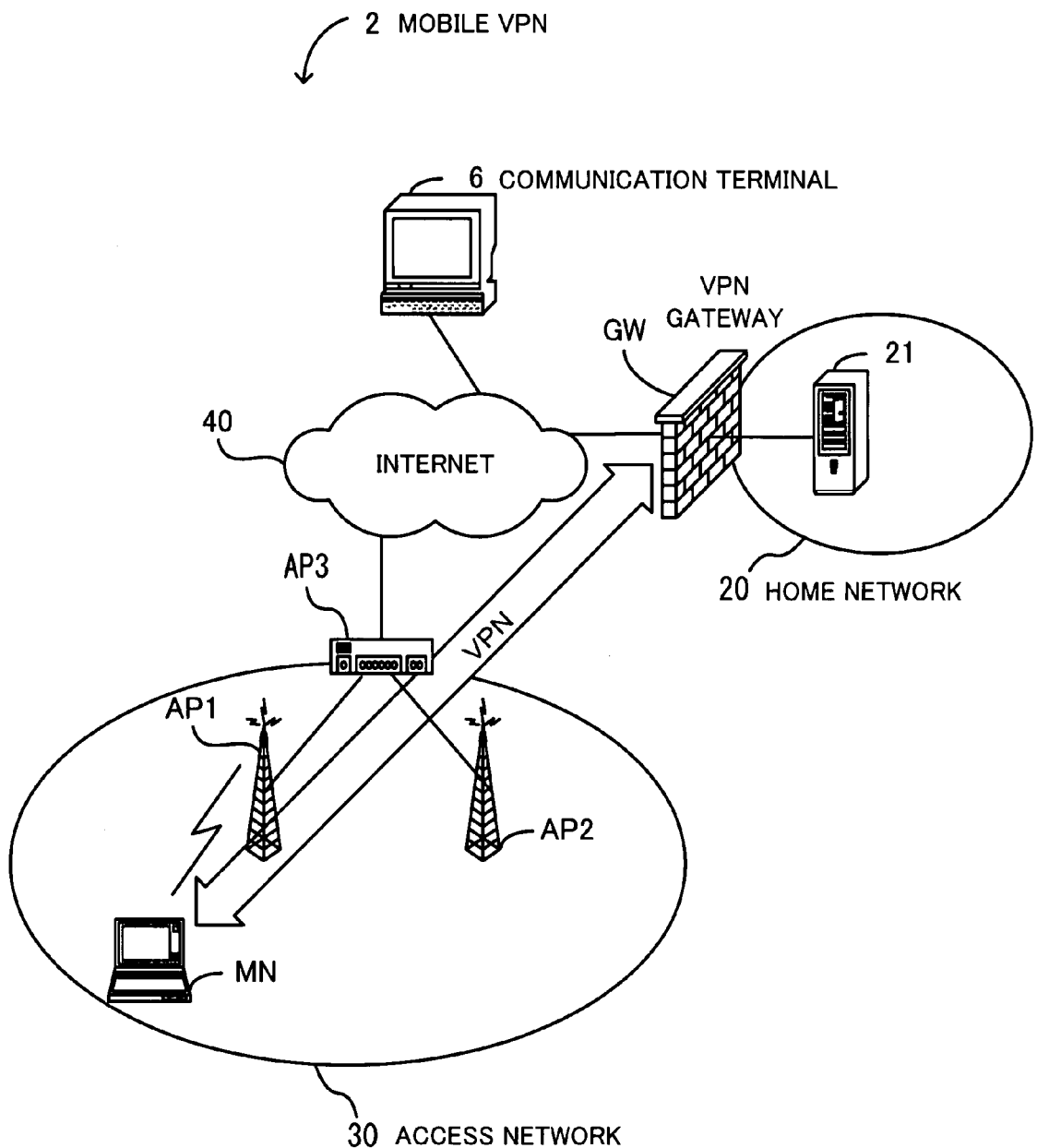
FIG. 2 shows an example structure of a mobile VPN.

A case in which the packet communication system 1 is applied to the mobile-VPN communication method will be described next in detail. FIG. 2 shows an example structure of a mobile VPN 2. The mobile VPN 2 includes a home network 20, an access network 30, and the Internet 40.

A home agent 21 for managing the position of a mobile node MN is disposed in the home network 20. Access points AP1 to AP3, such as a base station and a router, are disposed in the access network 30. The mobile node MN has been moved from the home network 20 to the access network 30, serving as a visitor-location network, and is performing communication.

A VPN gateway GW is disposed between the Internet 40 and the home network 20 to connect the Internet 40 and the home agent 21. The access point AP3 and a communication terminal 6 are connected to the Internet 40.

Both the mobile node MN and the VPN gateway GW have both functions of the packet transmission apparatus 10-1 and the packet receiving apparatus 10-2. Therefore, when the mobile node MN sends a packet to the VPN gateway GW, the mobile node MN serves as the packet transmission apparatus 10-1, and the VPN gateway GW serves as the packet receiving apparatus 10-2. When the VPN gateway GW sends a packet to the mobile node MN, the VPN gateway GW serves as the packet transmission apparatus 10-1, and the mobile node MN serves as the packet transmission apparatus 10-2.

Various addresses used in the following description will be collectively shown below.

- HoA: An IP address in the home network 20. A home address assigned to the mobile node MN in Mobile IP (hereinafter also called MIP).
- CoA: Care of address assigned to the mobile node MN in MIP.
- PHY: An IP address assigned to the mobile node MN in the access network 30.
- VPNGW: An IP address of an interface of the VPN gateway GW.
- HA: An IP address of an interface of the home agent 21:
- CN: An IP address of an interface of the communication terminal 6, viewed from the mobile node MN.
- NAT: An IP address of an interface of an address converter (NAT 8, described later with reference to FIG. 5)

Figure 3:
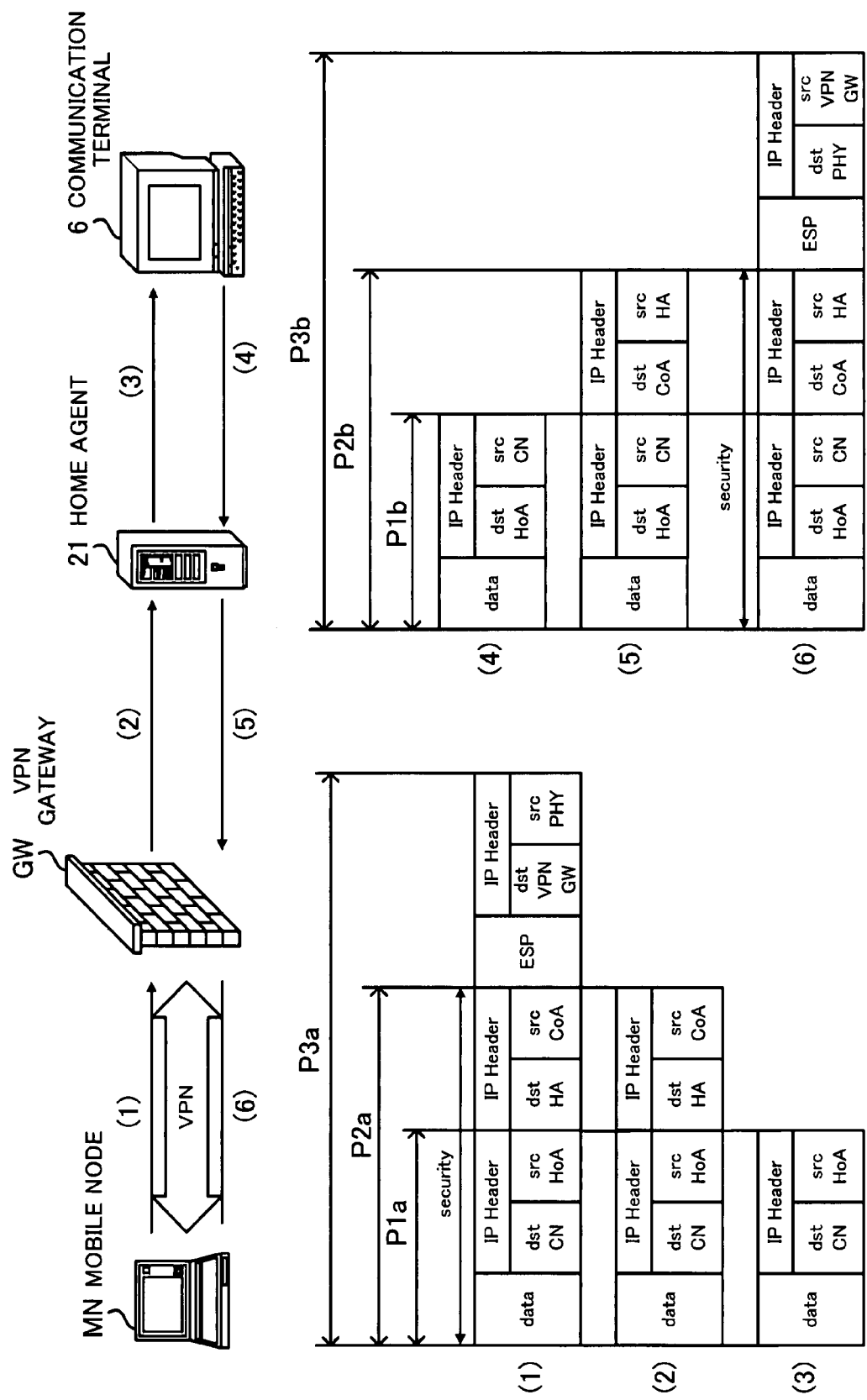
FIG. 3 shows packet formats.
Figure 4:
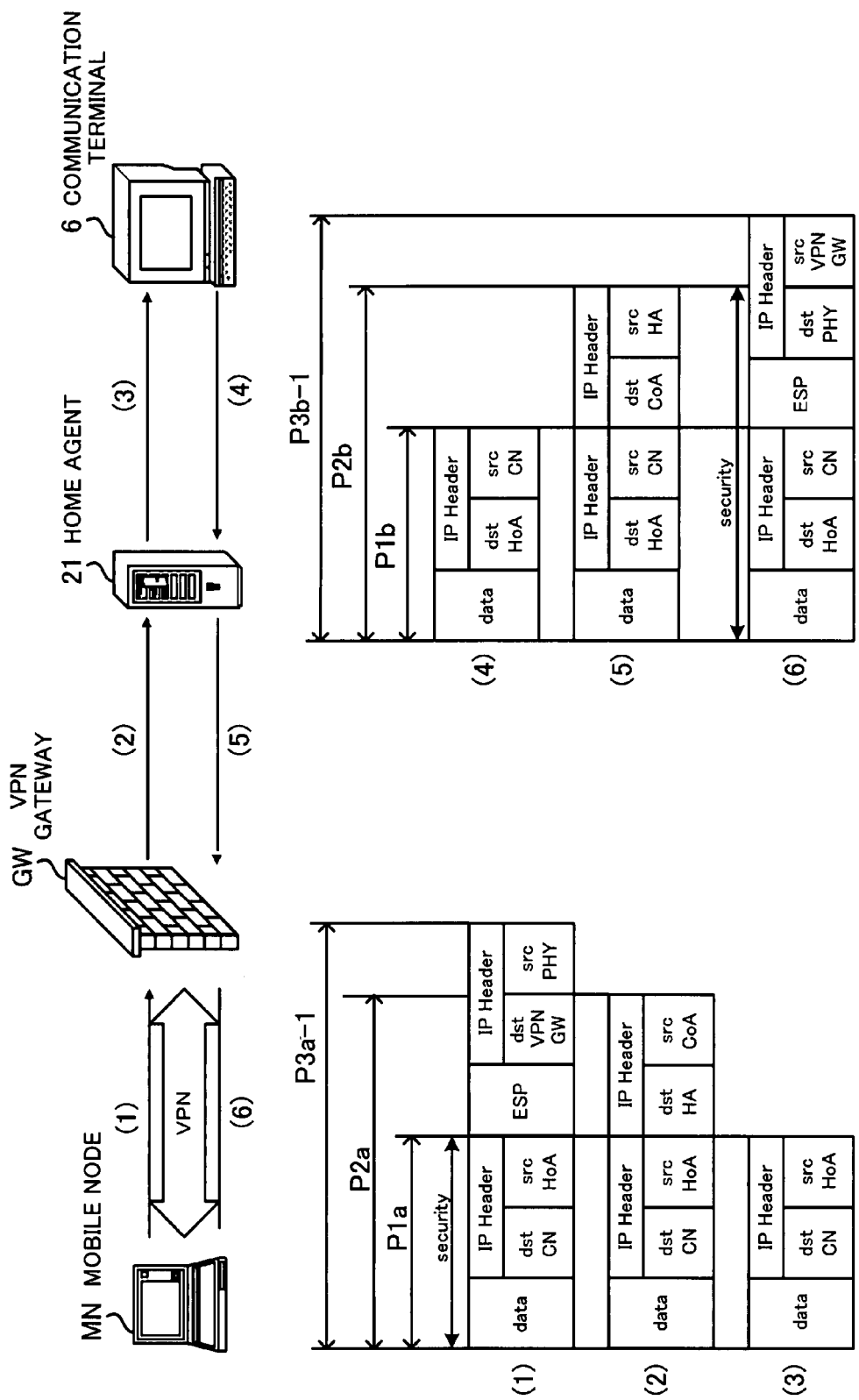
FIG. 4 shows packet formats.

A difference in packet format between a conventional case and the present invention in the mobile VPN 2 will be described next. FIG. 3 shows packet formats in the conventional case, and FIG. 4 shows packet formats in the present invention. Packet formats (1) to (6) in FIG. 3 will be described below.

(1) Packet Format from the Mobile Node MN to the VPN Gateway GW

The original packet P1a is formed of data and an IP header having a transmission source (src) of HoA and a destination (dst) of CN. An IP header having a transmission source (src) of CoA and a destination (dst) of HA is added to the packet P1a, as an MIP capsulation header, to generate a packet P2a. Further, an ESP header by IPsec ESP tunneling, serving as a security header, and an IP header having a transmission source (src) of PHY and a destination (dst) of VPNGW, serving as a tunnel-communication header, are attached to the packet P2a to generate a packet P3a (the range of concealment corresponds to the packet P2a). The mobile node MN sends the packet P3a to the VPN gateway GW. When ESP authentication is performed, a data section called a trailer is added, which is omitted in the figure.

(2) Packet Format from the VPN Gateway GW to the Home Agent 21

The VPN gateway GW receives the packet P3a, decapsulates it to generate the packet P2a, and sends the packet P2a to the home agent 21.

(3) Packet Format from the Home Agent 21 to the Communication Terminal 6

The home agent 21 receives the packet P2a, decapsulates it to generate the packet P1a, and sends the packet P1a to the communication terminal 6.

(4) Packet Format from the Communication Terminal 6 to the Home Agent 21

The communication terminal 6 generates a packet P1b formed of data and an IP header having a transmission source (src) of CN and a destination of HoA, and sends it to the home agent 21.

(5) Packet Format from the Home Agent 21 to the VPN Gateway GW

The home agent 21 receives the packet P1b, adds an IP header having a transmission source (src) of HA and a destination of CoA to the packet P1b as an MIP capsulation header to generate a packet P2b, and sends it to the VPN gateway GW.

(6) Packet Format from the VPN Gateway GW to the Mobile Node MN

The VPN gateway GW receives the packet P2b, adds an ESP header by IPsec ESP tunneling, serving as a security header, and an IP header having a transmission source (src) of VPNGW and a destination (dst) of PHY, serving as a tunnel-communication header, to the packet P2b to generate a packet P3b (the range of concealment corresponds to the packet P2a), and sends it to the mobile node MN.

FIG. 4 shows packet formats used when the packet communication system 1 is applied to the mobile VPN 2. Packet formats (1) to (6) in FIG. 4 will be described below.

(1) Packet Format from the Mobile Node MN to the VPN Gateway GW

The original packet P1a is formed of data and an IP header having a transmission source (src) of HoA and a destination (dst) of CN. An MIP capsulation header is omitted. An ESP header by IPsec ESP tunneling, serving as a security header, and an IP header having a transmission source (src) of PHY and a destination (dst) of VPNGW, serving as a tunnel-communication header, are attached to the packet P1a to generate a packet P3a1 (the range of concealment corresponds to the packet P1a). The mobile node MN sends the packet P3a1 to the VPN gateway GW.

(2) Packet Format from the VPN Gateway GW to the Home Agent 21

The VPN gateway GW receives the packet P3a1, decapsulates it, recovers an MIP capsulation header having a transmission source (src) of CoA and a destination (dst) of HA to generate a packet P2a, and sends the packet P2a to the home agent 21.

(3) Packet Format from the Home Agent 21 to the Communication Terminal 6

The home agent 21 receives the packet P2a, decapsulates it to generate the packet P1a, and sends the packet P1a to the communication terminal 6.

(4) Packet Format from the Communication Terminal 6 to the Home Agent 21

The communication terminal generates a packet P1b formed of data and an IP header having a transmission source (src) of CN and a destination of HoA, and sends it to the home agent 21.

(5) Packet Format from the Home Agent 21 to the VPN Gateway GW

The home agent 21 receives the packet P1b, adds an IP header having a transmission source (src) of HA and a destination of CoA to the packet P1b as an MIP capsulation header to generate a packet P2b, and sends it to the VPN gateway GW.

(6) Packet Format from the VPN Gateway GW to the Mobile Node MN

The VPN gateway GW receives the packet P2b, omits the MIP capsulation header, adds an ESP header by IPsec ESP tunneling, serving as a security header, and an IP header having a transmission source (src) of VPNGW and a destination (dst) of PHY, serving as a tunnel-communication header, to generate a packet P3b-1, and sends it to the mobile node MN.

The omission and recovery of the header information above will be summarized below. The mobile node MN sends an IP packet to the VPN gateway GW with an MIP capsulation IP being omitted by the mobile node MN.

The omitted IP header information is specified in a security policy database (SPD) of the mobile node MN as an IPsec transmission security policy, and is an IP header having a transmission source IP address of CoA and a destination IP address of HA.

The VPN gateway GW receives the IP packet with the IP header omitted and recovers an IP header having a transmission source IP address of CoA and a destination IP address of HA from a receiving security policy specified in an SPD of the VPN gateway GW.

Conversely, the VPN gateway GW sends an IP packet to the mobile node MN with an MIP capsulation IP header being omitted. The omitted IP header information is specified in the SPD of the VPN gateway GW as an IPsec transmission security policy, and is an IP header having a transmission source IP address of HA and a destination IP address of CoA.

The mobile node MN receives the IP packet with the IP header omitted and recovers an IP header having a transmission source IP address of HA and a destination IP address of CoA from a receiving security policy specified in the SPD of the mobile node MN. In the above description, the IPsec ESP header serves as a security header. An IP authentication (AH) header may serve as a security header.

A brief description will be given to ESP and AH. IPsec mainly provides functions of (1) concealing (encrypting) a communication content, (2) authenticating the other communication party, (3) detecting forgery or tampering of a communication content, and (4) detecting a replay attack. In IPsec, two protocols, ESP and AH, are defined. ESP provides the functions of (1) and (3), whereas AH provides the functions of (2), (3), and (4). The tampering prevention function of AH is applied to the whole of a packet, including its IP header. The tampering prevention function of ESP is applied only to a payload.

Both of ESP and AH have two modes, transport mode and tunnel mode. In the present invention, an operation in the tunnel mode is described.

Figure 5:
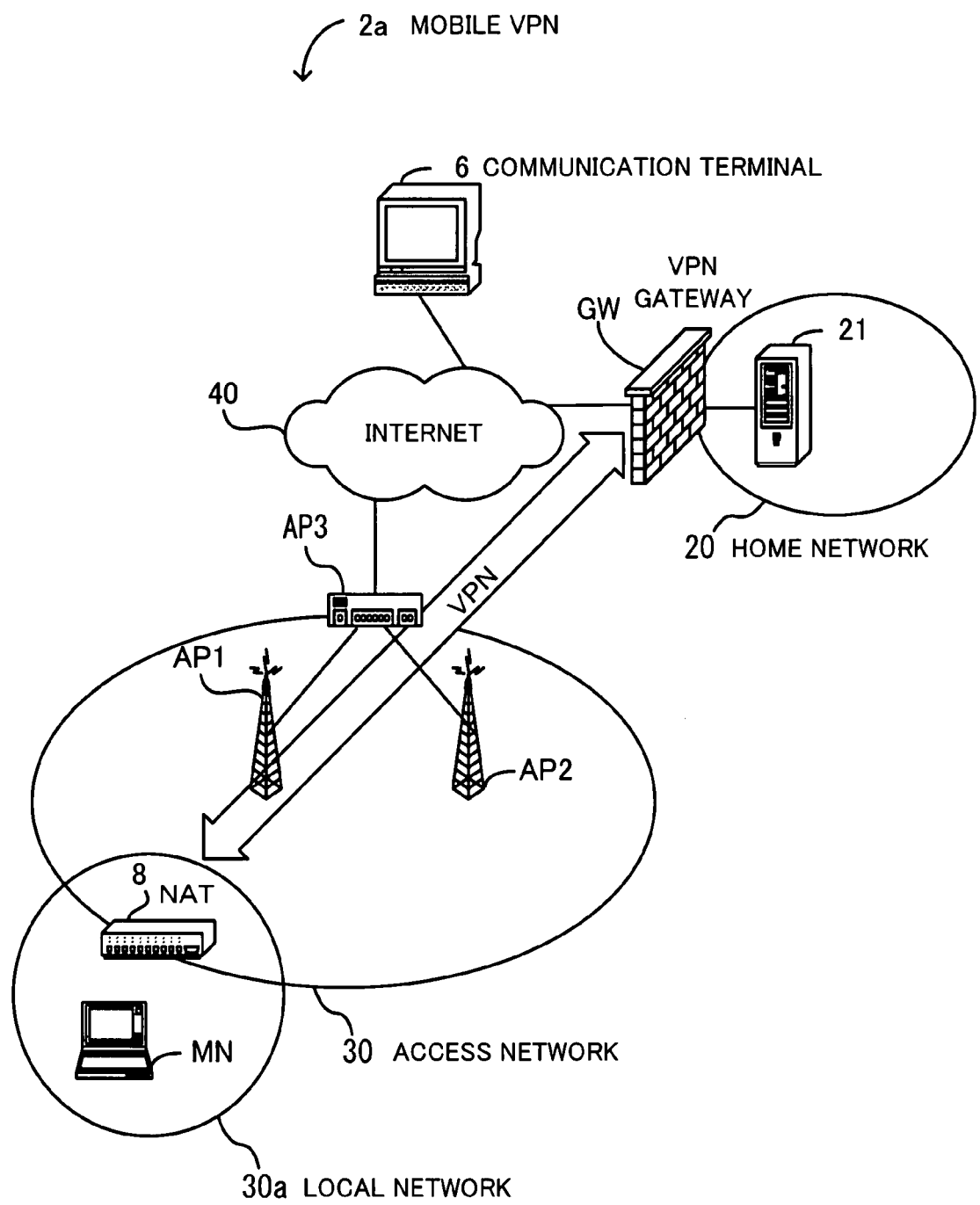
FIG. 5 shows an example structure of a mobile VPN having an address converter.

A case in which the packet communication system 1 is applied to a mobile VPN having an address converter (NAT: network address translation) will be described next. FIG. 5 shows an example structure of a mobile VPN 2a having an address converter. The mobile VPN 2a includes a home network 20, an access network 30, the Internet 40, and a local network 30a.

A home agent 21 for managing the position of a mobile node MN is disposed in the home network 20. Access points AP1 to AP3, such as a base station and a router, are disposed in the access network 30. The address converter (hereinafter called a NAT 8) is disposed in the local network 30a. The mobile node MN exists in the local network 30a, serving as a visitor-location network, and is performing communication through the NAT 8. The NAT 8 converts a private IP address to a global IP address to allow communication through the Internet 40.

A VPN gateway GW is disposed between the Internet 40 and the home network 20 to connect the Internet 40 and the home agent 21. The access point AP3 and a communication terminal 6 are connected to the Internet 40.

Figure 6:
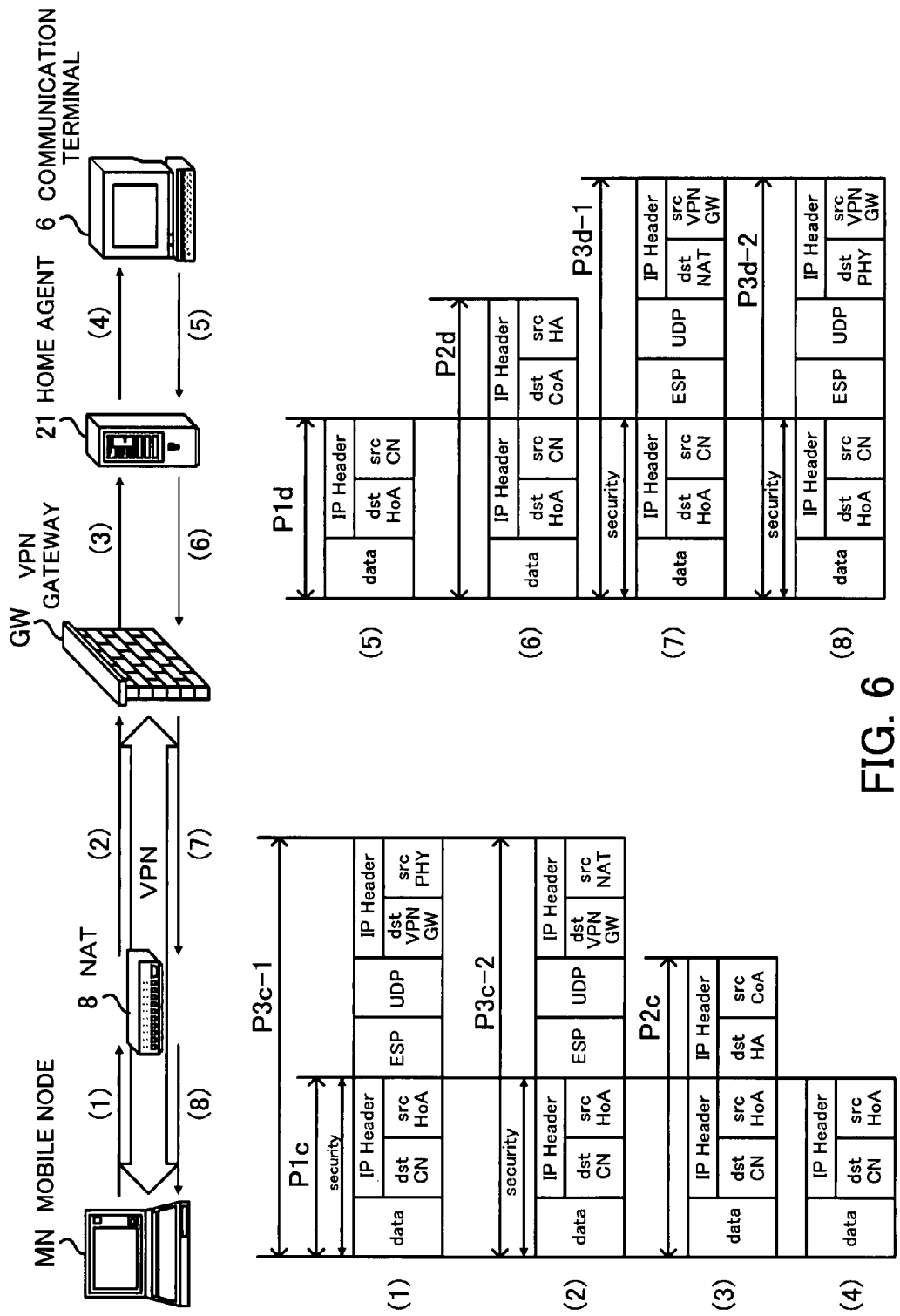
FIG. 6 shows packet formats.

Packet formats of the present invention, used in the mobile VPN 2a will be described next. FIG. 6 shows packet formats. A figure showing packet formats in a conventional case is omitted. (In the conventional case, an MIP capsulation header is inserted between an ESP header and a packet P1c or between an ESP header and a packet P1d shown in FIG. 6.)

(1) Packet Format from the Mobile Node MN to the NAT 8

The original packet P1c is formed of data and an IP header having a transmission source (src) of HoA and a destination (dst) of CN. An MIP capsulation header is omitted. An ESP header by IPsec ESP tunneling, serving as a security header, and a UDP header and an IP header having a transmission source (src) of PHY and a destination (dst) of VPNGW, both serving as tunnel-communication headers, are attached to the packet P1c to generate a packet P3c-1 (the range of concealment corresponds to the packet P1c). The mobile node MN sends the packet P3c-1 to the NAT 8.

(2) Packet Format from the NAT 8 to the VPN Gateway GW

The NAT 8 receives the packet P3c-1, changes a transmission source (src) of PHY to a transmission source (src) of NAT to generate a packet P3c-2, and sends it to the VPN gateway GW.

(3) Packet Format from the VPN Gateway GW to the Home Agent 21

The VPN gateway GW receives the packet P3c-2, decapsulates it, recovers an MIP capsulation header having a transmission source (src) of CoA and a destination (dst) of HA to generate a packet P2c, and sends the packet P2c to the home agent 21.

(4) Packet Format from the Home Agent 21 to the Communication Terminal 6

The home agent 21 receives the packet P2c, decapsulates it to generate the packet P1c, and sends the packet P1c to the communication terminal 6.

(5) Packet Format from the Communication Terminal 6 to the Home Agent 21

The communication terminal 6 generates a packet P1d formed of data and an IP header having a transmission source (src) of CN and a destination of HoA, and sends it to the home agent 21.

(6) Packet Format from the Home Agent 21 to the VPN Gateway GW

The home agent 21 receives the packet P1d, adds an IP header having a transmission source (src) of HA and a destination of CoA to the packet P1d as an MIP capsulation header to generate a packet P2d, and sends it to the VPN gateway GW.

(7) Packet Format from the VPN Gateway GW to the NAT 8

The VPN gateway GW receives the packet P2d, omits the MIP capsulation header, adds an ESP header by IPsec ESP tunneling, serving as a security header, and a UDP header and an IP header having a transmission source (src) of VPNGW and a destination (dst) of NAT, both serving as tunnel-communication headers, to generate a packet P3d–1, and sends it to the NAT 8.

(8) Packet Format from the NAT 8 to the Mobile Node MN

The NAT 8 receives the packet P3d–1, changes a transmission destination (dst) of NAT to a transmission destination (dst) of PHY to generate a packet P3d–2, and sends it to the mobile node MN.

Figure 7:
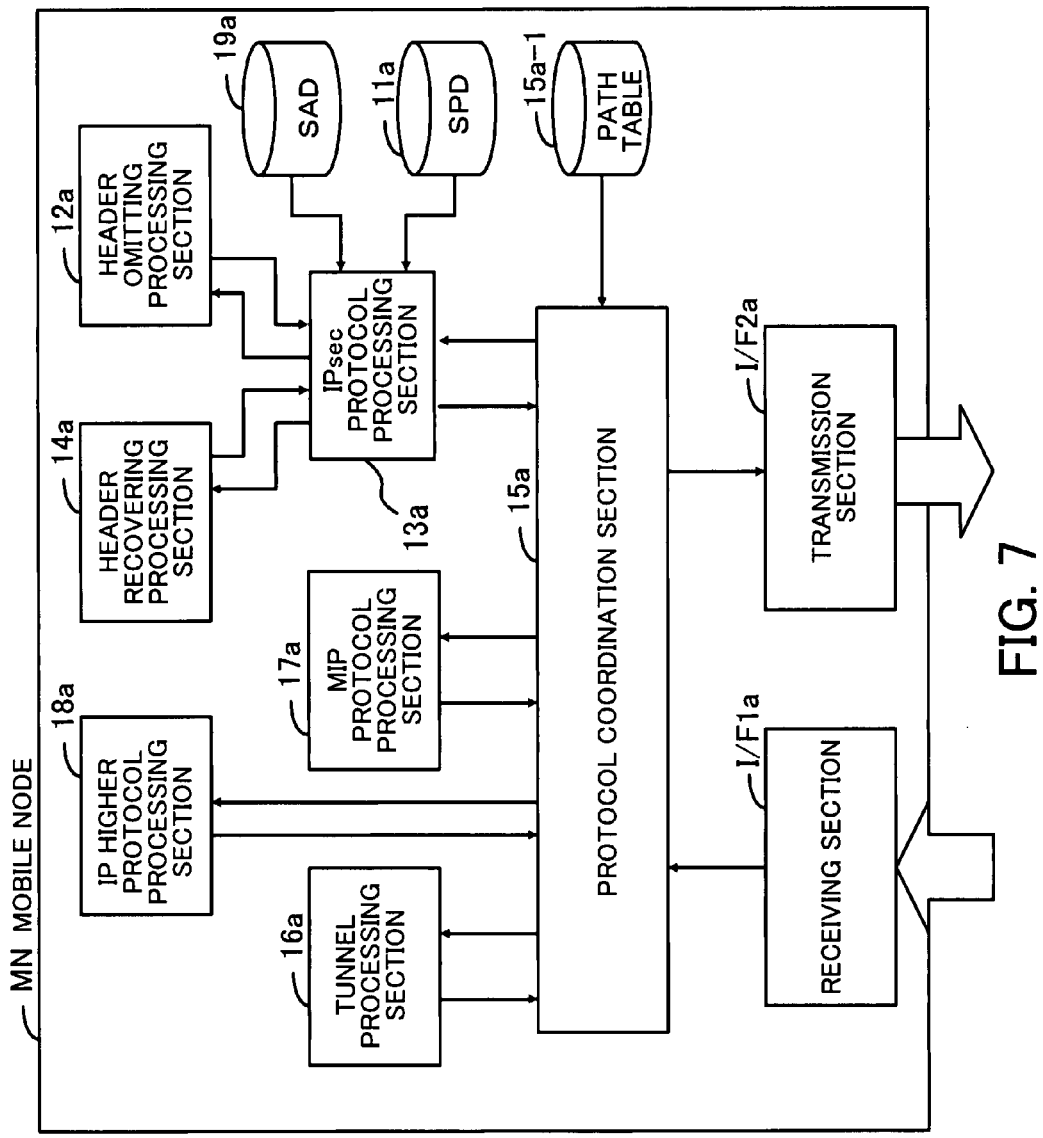
FIG. 7 shows the internal structure of a mobile node.

The internal structures of the mobile node MN and the VPN gateway GW will be described next. FIG. 7 shows the internal structure of the mobile node MN. The mobile node MN serves as a mobile host or a mobile router defined in RFC 3344 or RFC 3775, and has an IPsec VPN function and an IP-header omitting function based on a security policy.

The mobile node MN has the functions of the packet transmission apparatus 10-1 and the packet receiving apparatus 10-2, and is formed of a receiving section I/F1a, a transmission section I/F2a, an SPD 11a (corresponding to the transmission security policy database 11-1 and the receiving security policy database 11-2 in FIG. 1), a header omitting processing section 12a (corresponding to the header-information omitting section 12-1 in FIG. 1), an IPsec protocol processing section 13a, a header recovering processing section 14a (corresponding to the header-information recovering section 14-2 in FIG. 1), a protocol coordination section 15a, a path table 15a1, a tunnel processing section 16a, an MIP protocol processing section 17a, an IP higher protocol processing section 18a, and a security association database (SAD) 19a.

The functions of the packet transmission processing section 13-1 and the packet receiving processing section 15-2, shown in FIG. 1, are implemented by the receiving section I/F1a, the transmission section I/F2a, the IPsec protocol processing section 13a, the protocol coordination section 15a, the path table 15a1, the tunnel processing section 16a, the MIP protocol processing section 17a, the IP higher protocol processing section 18a, and the SAD 19a.

The receiving section I/F1a receives an IP packet from the outside. The transmission section I/F 2a sends an IP packet to the outside. The protocol coordination section 15a uses the path table 15a1 to perform packet receiving processing and transmission processing.

In the receiving processing, when the destination IP address indicates another node, the IP packet is sent according to the path table 15a1. When the destination IP address indicates the mobile node, the next header of the received IP packet is referred to ask a corresponding protocol processing section to perform processing. After necessary protocol processing is finished, the data is sent to a corresponding application.

In the transmission processing, necessary processing, such as tunneling and IPsec, is applied in coordination with the tunnel processing section 16a and the IPsec protocol processing section 13a to an IP packet sent from an application and processed by the IP higher protocol processing section 18a or to an IP packet received from another node, and the IP packet is sent to the designated node.

The tunnel processing section 16a performs MIP tunneling, and capsulates or decapsulates user data. The MIP protocol processing section 17a registers HoA and CoA in the home agent or releases them. With this, seamless communication using a constant IP address HoA, not depending on the position, is provided for applications. The MIP protocol processing section 17a also specifies a tunneling path in the path table 15a1 to allow MIP communication.

A condition under which security is applied (security policy) is specified in the SPD 11a. For example, a transmission-source IP address, a destination IP address, and an IP higher protocol are specified. Security association specified in the SAD 19a is applied to an IP packet that satisfies the specified security policy.

Security association means parameters for security between entities communicating with each other by using IPsec. The parameters mainly include a parameter indicating whether the tunnel mode or the transport mode is applied, a parameter indicating whether UDP capsulating is applied, a parameter indicating whether ESP encryption is applied, a parameter indicating whether AH authentication is applied, and parameters indicating their algorithms, keys, and security parameter indexes (SPIs).

The IP higher protocol processing section 18a adds an IP header in a transport protocol specified by an application to data sent from the application. The IP higher protocol processing section 18a also applies the same processing to a packet forwarded from another node when the mobile node MN operates as a NAT server. Therefore, the mobile node MN can serve as a mobile router, a mobile host, or a NAT server also working as a mobile router.

The IPsec protocol processing section 13a has two databases, the SAD 19a and the SPD 11a. The SPD 11a additionally includes information indicating whether an IP header is omitted. The IPsec protocol processing section 13a compares an IP packet with the contents of the SPD 11a. When they match, the security policy is applied to the IP packet. The security policy includes IP header recovery, IP header omission, encryption, decryption, and authentication. Depending on the security policy to be applied, the IPsec protocol processing section 13a asks the header recovering processing section 14a and the header omitting processing section 12a to perform processing, and then, applies encryption, decryption, and authentication.

The header recovering processing section 14a recovers the omitted IP header according to the SPD 11a. The IP header to be recovered is a tunneling IP header assigned by MIP and having a transmission source IP address of HA and a destination IP address of CoA. When NAT is applied, a tunneling IP header assigned by MIP is UDP-capsulated and forwarded as a UDP payload. Therefore, when NAT is applied, an IP header is recovered in a UDP capsule.

The header omitting processing section 12a omits an IP header according to the SPD 11a. The IP header to be omitted is a tunneling IP header assigned by MIP and having a transmission source IP address of CoA and a destination IP address of HA. When NAT is applied, a tunneling IP header assigned by MIP is UDP-capsulated and forwarded as a UDP payload. Therefore, when NAT is applied, an IP header is omitted in a UDP capsule.

Figure 8:
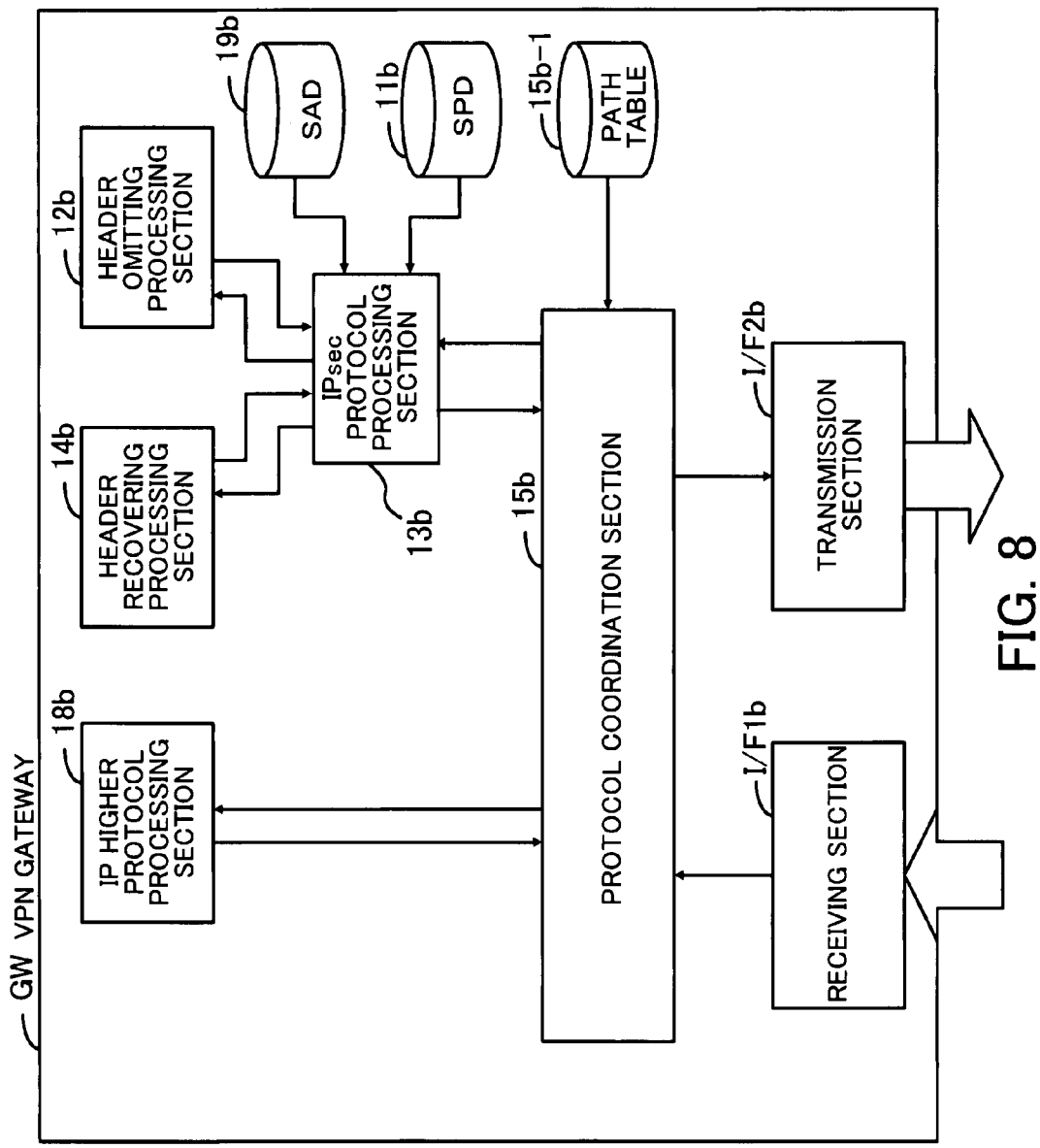
FIG. 8 shows the internal structure of a VPN gateway.

FIG. 8 shows the internal structure of the VPN gateway GW. The VPN gateway GW has the IPsec VPN function and an IP-header omitting function based on a security policy.

The VPN gateway GW has the functions of the packet transmission apparatus 10-1 and the packet receiving apparatus 10-2, and is formed of a receiving section I/F1b, a transmission section I/F2b, an SPD 11b (corresponding to the transmission security policy database 11-1 and the receiving security policy database 11-2 in FIG. 1), a header omitting processing section 12b (corresponding to the header-information omitting section 12-1 in FIG. 1), an IPsec protocol processing section 13*b*, a header recovering processing section 14*b* (corresponding to the header-information recovering section 14-2 in FIG. 1), a protocol coordination section 15*b*, a path table 15*b*-1, an IP higher protocol processing section 18*b*, and an SAD 19*b*.

The functions of the packet transmission processing section 13-1 and the packet receiving processing section 15-2, shown in FIG. 1, are implemented by the receiving section I/F1*b*, the transmission section I/F2*b*, the IPsec protocol processing section 13*b*, the protocol coordination section 15*b*, the path table 15*b*-1, the IP higher protocol processing section 18*b*, and the SAD 19*b*.

The receiving section I/F1*b*, the transmission section I/F2*b*, the IPsec protocol processing section 13*b*, the protocol coordination section 15*b*, and the IP higher protocol processing section 18*b* operate in the same ways as those having the same names and shown in FIG. 7.

The header recovering processing section 14*b* performs the same basic operation as the header recovering processing section 14*a*, shown in FIG. 7. The IP header to be recovered by the header recovering processing section 14*b* is an IP header having a transmission source IP address of CoA and a destination IP address of HA.

The header omitting processing section 12*b* performs the same basic operation as the header omitting processing section 12*a*, shown in FIG. 7. The IP header to be omitted by the header omitting processing section 12*a* is an IP header having a transmission source IP address of HA and a destination IP address of CoA.

Before detailed operations of the mobile node MN and the VPN gateway GW are described, the reason why an MIP capsulating header can be omitted or recovered will be described. In draft-ietf-mip4-vpn-problem-solution-01, which is an existing technology, three addresses, a home address (HoA), a care-of address (CoA), and a phy address (PHY), are used to implement a capsulating format in Mobile IP and key consistency in IPsec VPNs.

When the VPN gateway GW is provided as shown in the network of FIG. 2, the tunnel mode is usually applied in IPsec. When the IPsec tunnel mode is applied, a transmission security policy and a receiving security policy are specified in the SPD 11*a* and the SPD 11*b*. Security policies to be applied to the packets P2*a* and P2*b*, which are security targets in (1) and (6) of FIG. 4, are specified.

In the packet communication system 1, a transmission source (src) of CoA and a destination (dst) of HA are specified as a transmission security policy, and a transmission source (src) of HA and a destination (dst) of CoA are specified as a receiving security policy, in the SPD 11*a* of the mobile node MN.

A transmission source (src) of HA and a destination (dst) of CoA are specified as a transmission security policy, and a transmission source (src) of CoA and a destination (dst) of HA are specified as a receiving security policy, in the SPD 11*b* of the VPN gateway GW.

HA and CoA will be described below. HA indicates the address of the home agent 21 in Mobile IP, and is usually a fixed address in Mobile IP. A unit for selecting (a single or a plurality of) HA dynamically from the home agent 21 is also prepared, but, once selected, HA is usually fixed.

CoA is an address in a network controlled by the VPN gateway GW. The VPN gateway GW is installed so as to protect a segment of the home agent 21, and a combination of the home agent 21 and the VPN gateway GW is fixed. In other words, when the address of the home agent 21 is determined, the address of the VPN gateway GW is determined, and CoA, which is an address in a network controlled by the VPN gateway GW, is also fixed. CoA can be assigned by DHCP dynamic acquisition, manual assignment, or other methods, but, once assigned, CoA is fixed.

Therefore, HA and CoA are both fixed addresses. In addition, HA or CoA in an MIP capsulating header is not used in communication between the mobile node MN and the VPN gateway GW. When HA and CoA are specified in advance in the SPD 11*a* of the mobile node MN and the SPD 11*b* of the VPN gateway GW, it is not necessary to assign them to an IP packet. When a security policy is checked, HA and CoA can be omitted/recovered in the mobile node MN and the VPN gateway GW. In this way, the network bandwidth of a communication path between the mobile node MN and the VPN gateway GW can be reduced.

Figure 9:
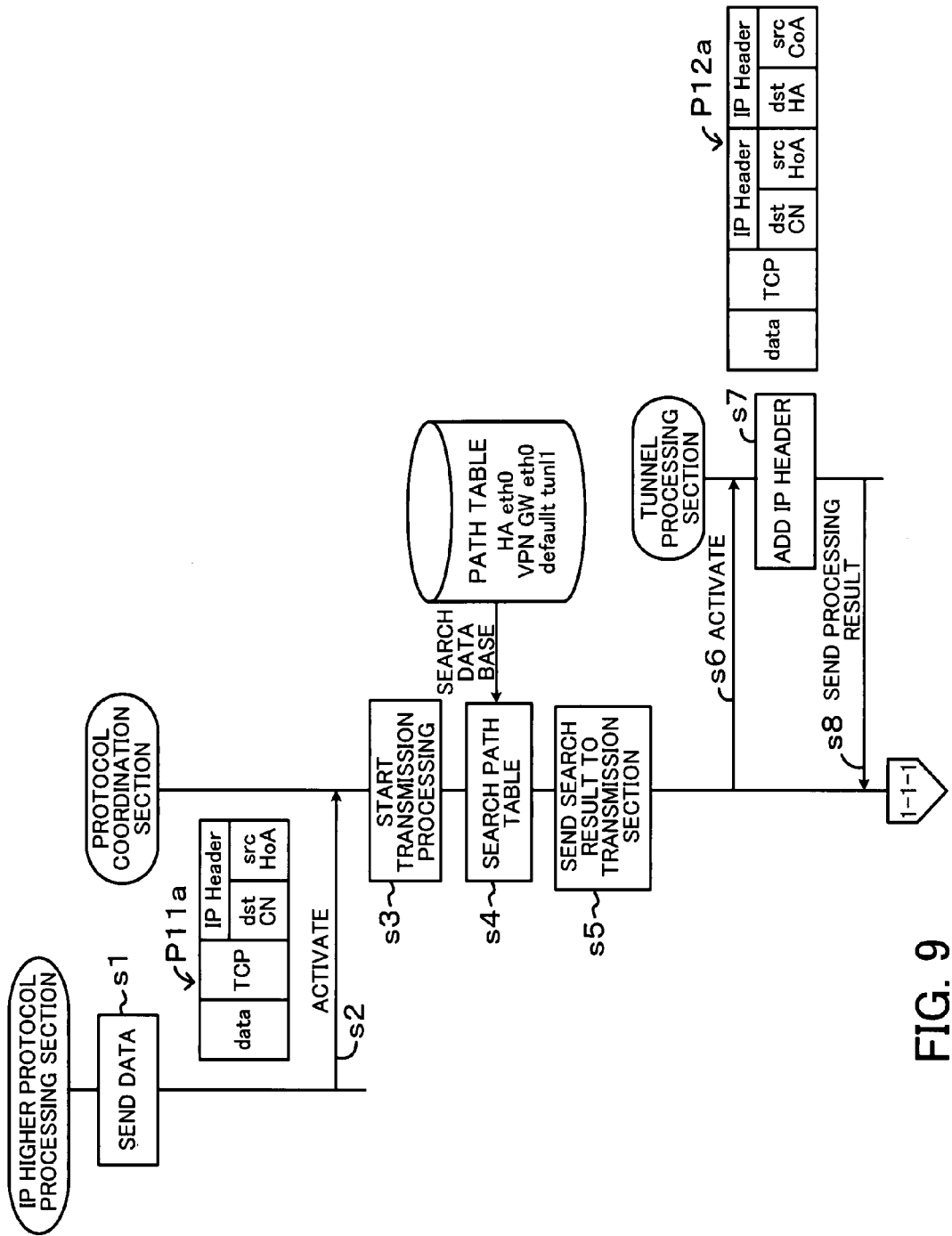
FIG. 9 shows a transmission processing flow of the mobile node.
Figure 10:
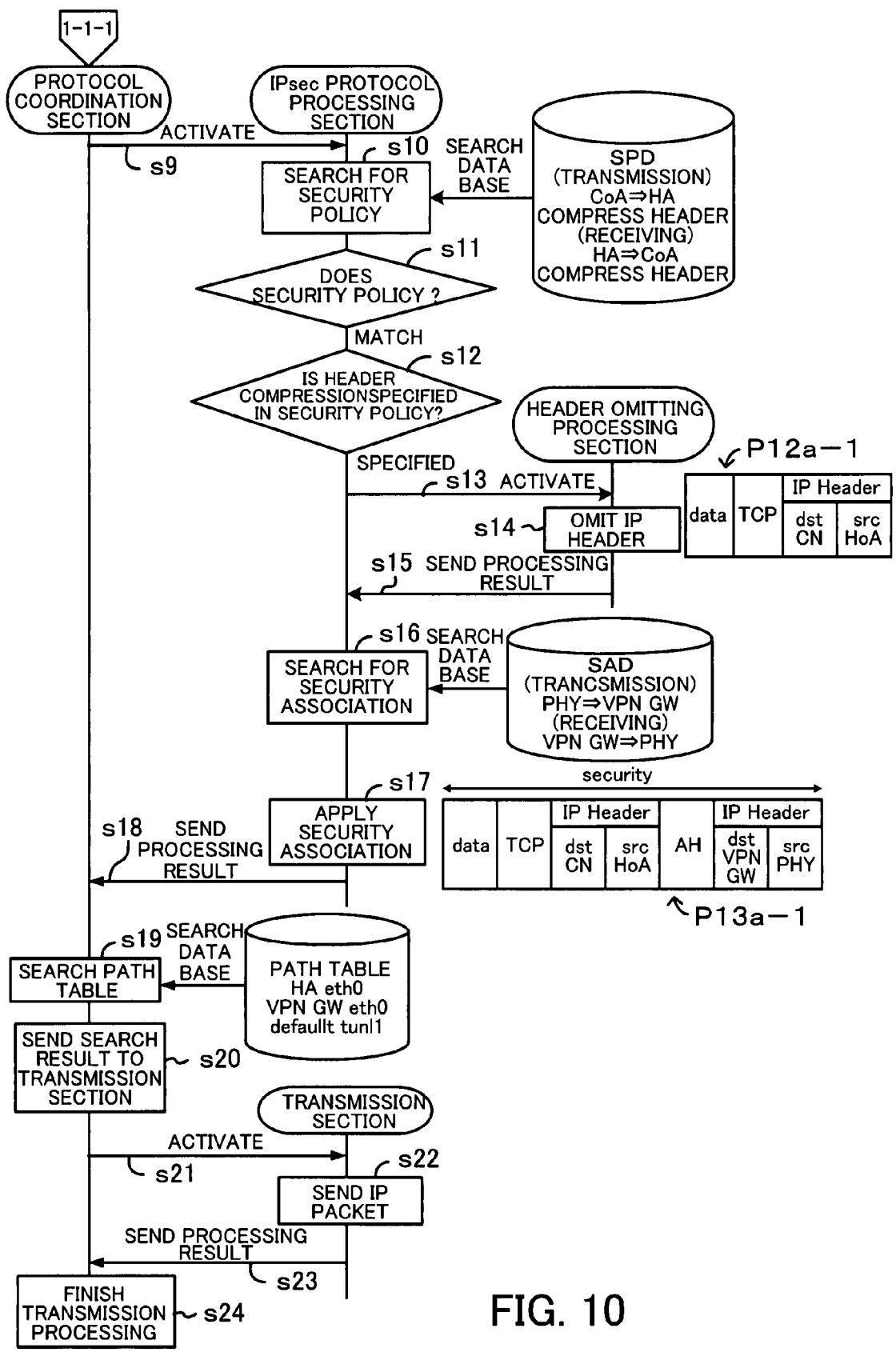
FIG. 10 shows the transmission processing flow of the mobile node.
Figure 11:
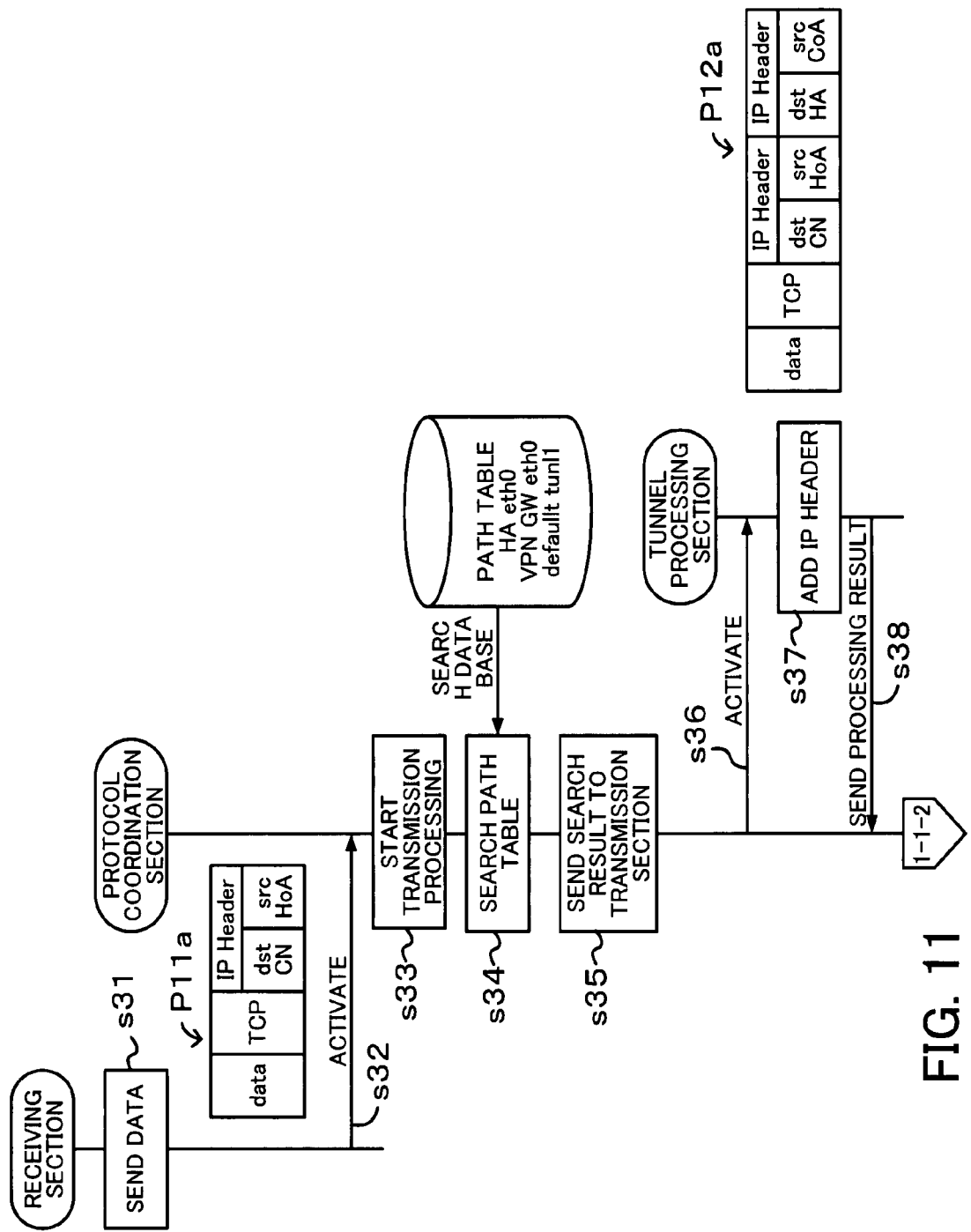
FIG. 11 shows a transmission processing flow of the mobile node.
Figure 12:
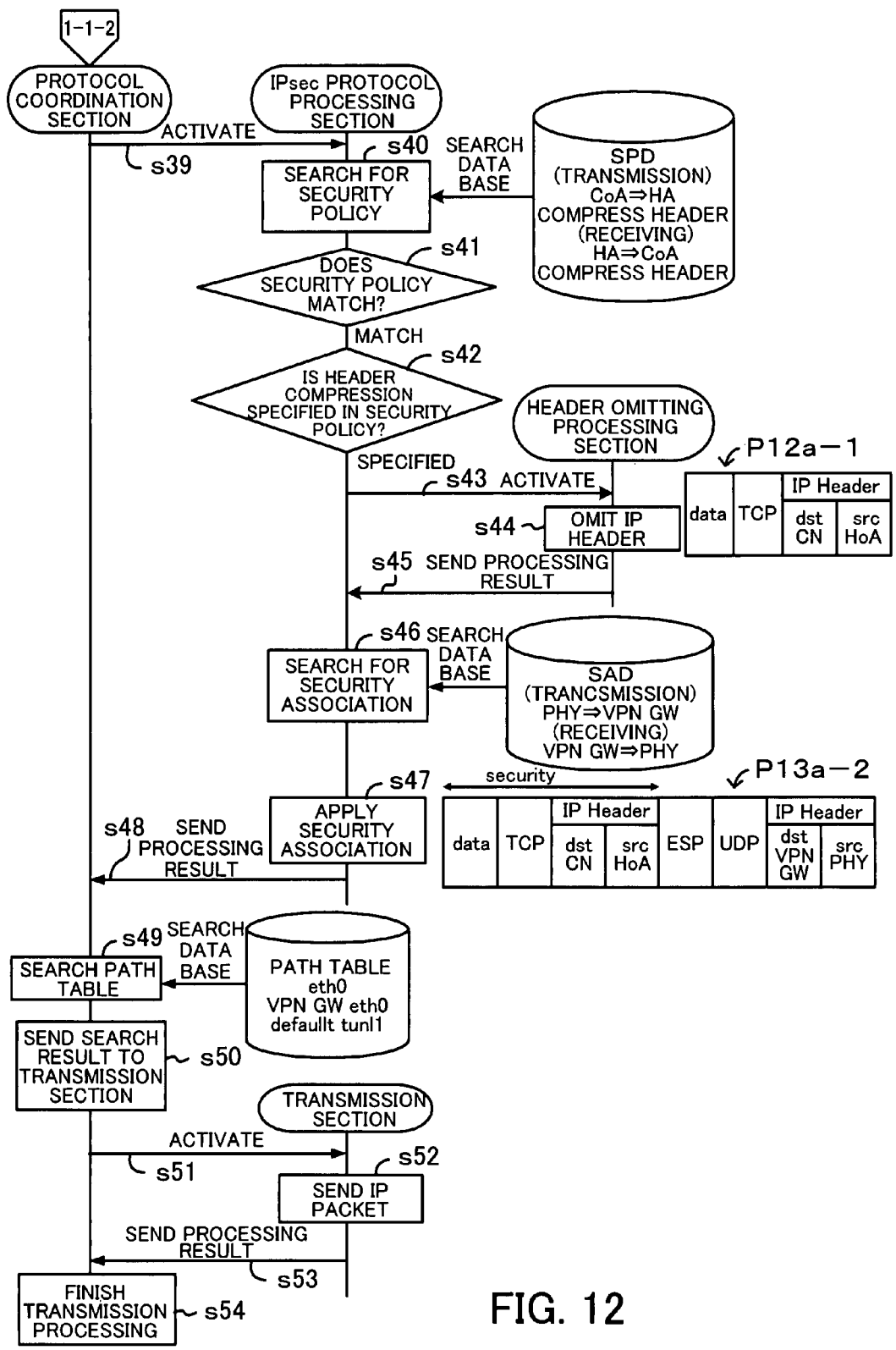
FIG. 12 shows the transmission processing flow of the mobile node.

The operation of the mobile node MN will be described next. FIG. 9 and FIG. 10 show a transmission processing flow (transmission processing flow 1) used in the network structure of the mobile VPN 2 shown in FIG. 2. FIG. 11 and FIG. 12 show a transmission processing flow (transmission processing flow 2) used in the network structure (a case where the NAT 8 is provided) of the mobile VPN 2*a* shown in FIG. 5.

Transmission Processing Flow 1

FIG. 9 and FIG. 10 show a transmission processing flow of the mobile node MN. The mobile node MN serves as a mobile host.

In FIG. 9, the IP higher protocol processing section 18*a* sends a packet P11*a* (in step s1) and activates the protocol coordination section 15*a* (in step s2). The protocol coordination section 15*a* starts transmission processing (in step s3), searches the path table 15*a*1 (in step s4), and sends the search result to the transmission section I/F2*a* (in step s5). The protocol coordination section 15*a* activates the tunnel processing section 16*a* (in step s6). The tunnel processing section 16*a* adds an MIP capsulating IP header to the packet P11*a* to generate a packet P12*a* (in step s7) and sends the processing result to the protocol coordination section 15*a* (in step s8).

In FIG. 10, the protocol coordination section 15*a* activates the IPsec protocol processing section 13*a* (in step s9). The IPsec protocol processing section 13*a* searches the SPD 11*a* for a security policy (in step s10). When the security policy matches (in step s11) and when the security policy specifies header omission (in step s12), the IPsec protocol processing section 13*a* activates the header omitting processing section 12*a* (in step s13). The header omitting processing section 12*a* omits a specified IP header from the packet P12*a* to generate a packet 12*a*1 (in step s14), and sends the processing result to the IPsec protocol processing section 13*a* (in step s15).

The IPsec protocol processing section 13*a* searches the SAD 19*a* for security association (in step S16). The IPsec protocol processing section 13*a* applies corresponding security association to add a security header by IPsec tunneling and a header for tunnel communication to the packet P12*a*1 to generate a packet P13*a*1 (in step s17). In the case of the figure, the tunneling mode in an AH header is applied as security association. The IPsec protocol processing section 13*a* sends the processing result to the protocol coordination section 15*a* (in step s18).

The protocol coordination section 15*a* uses the path table 15*a*1 to perform a path search (in step s19), sends the search result to the transmission section I/F2*a* (in step s20), and activates the transmission section I/F2*a* (in step s21). The transmission section I/F2*a* sends the packet P13*a*1 to the outside (in step s22), and sends the processing result to the protocol coordination section 15*a* (in step s23) to finish the transmission processing (in step s24).

The operations in the transmission processing flow 1 will be summarized below. An application (operating as a mobile host) running on the mobile node MN sends an IP packet, and the IP packet is capsulated by an MIP tunneling mechanism. The capsulated IP packet is compared with the contents of a security policy obtained by searching the SPD 11a, in the IPsec protocol processing section 13a. As a transmission security policy, a transmission source IP address of CoA, a destination IP address of HA, and IP-header omission enabled are specified.

As a result of comparison between the IP packet and the contents of the SPD 11a, the transmission security policy is applied. The header omitting processing section 12a omits an IP header specified in the SPD 11a. More specifically, an IP header having a transmission source IP address of CoA and a destination IP address of HA is omitted.

Then, corresponding security association specified in the SAD 19a is identified from the security policy and is applied. In the current case, the tunnel mode and AH are applied as the security association. Because of the tunnel mode, capsulating is performed with a transmission source IP address of PHY and a destination IP address of VPNGW. The IP packet to which the security association has been applied is sent through an interface according to the path table 15a1.

Transmission Processing Flow 2

FIG. 11 and FIG. 12 show a transmission processing flow of the mobile node MN. The mobile node MN serves as a mobile router.

In FIG. 11, when the receiving section I/F1a receives a packet P11a, the receiving section I/F1a sends the packet P11a (in step s31) and activates the protocol coordination section 15a (in step s32). The protocol coordination section 15a starts transmission processing (in step s33), searches the path table 15a1 (in step s34), and sends the search result to the transmission section I/F2a (in step s35). The protocol coordination section 15a activates the tunnel processing section 16a (in step s36). The tunnel processing section 16a adds an MIP capsulating IP header to the packet P11a to generate a packet P12a (in step s37) and sends the processing result to the protocol coordination section 15a (in step s38).

In FIG. 12, the protocol coordination section 15a activates the IPsec protocol processing section 13a (in step s39). The IPsec protocol processing section 13a searches the SPD 11a for a security policy (in step s40). When the security policy matches (in step s41) and when the security policy specifies header omission (in step s42), the IPsec protocol processing section 13a activates the header omitting processing section 12a (in step s43). The header omitting processing section 12a omits a specified IP header from the packet P12a to generate a packet 12a1 (in step s44), and sends the processing result to the IPsec protocol processing section 13a (in step s45).

The IPsec protocol processing section 13a searches the SAD 19a for security association (in step S46). The IPsec protocol processing section 13a applies corresponding security association to add a security header by IPsec tunneling and a header for tunnel communication to the packet P12a1 to generate a packet P13a-2 (in step s47). In the case of the figure, the tunneling mode in an ESP header is applied as security association. The IPsec protocol processing section 13a sends the processing result to the protocol coordination section 15a (in step s48).

The protocol coordination section 15a uses the path table 15a1 to perform a path search (in step s49), sends the search result to the transmission section I/F2a (in step s50), and activates the transmission section I/F2a (in step s51). The transmission section I/F2a sends the packet P13a-2 to the outside (in step s52), and sends the processing result to the protocol coordination section 15a (in step s53) to finish the transmission processing (in step s54).

Since the IP header is omitted by the header omitting processing section 12a, and then the security association is applied in the transmission processing flow 2, the same processing as in the transmission processing flow 1 is possible even for a network having the NAT 8. In the current case, the tunnel mode is used for the security association, an ESP header is used as a security header, and UDP tunneling is used for tunnel communication. Since the IP header is omitted before the security association in the IPsec tunnel mode is applied, existing processes such as path selection after the security association is applied are not affected.

Figure 13:
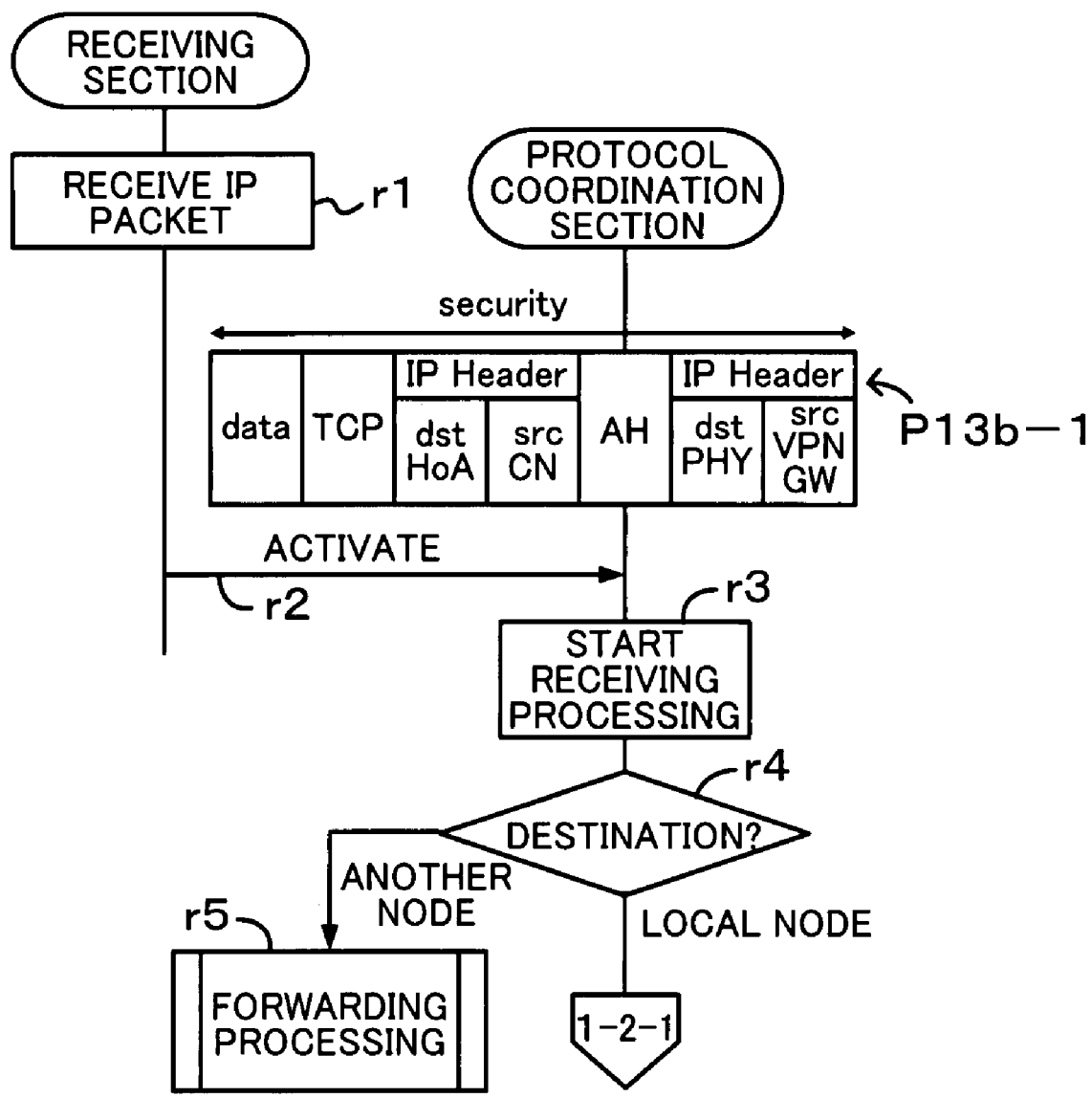
FIG. 13 shows a receiving processing flow of the mobile node.
Figure 14:
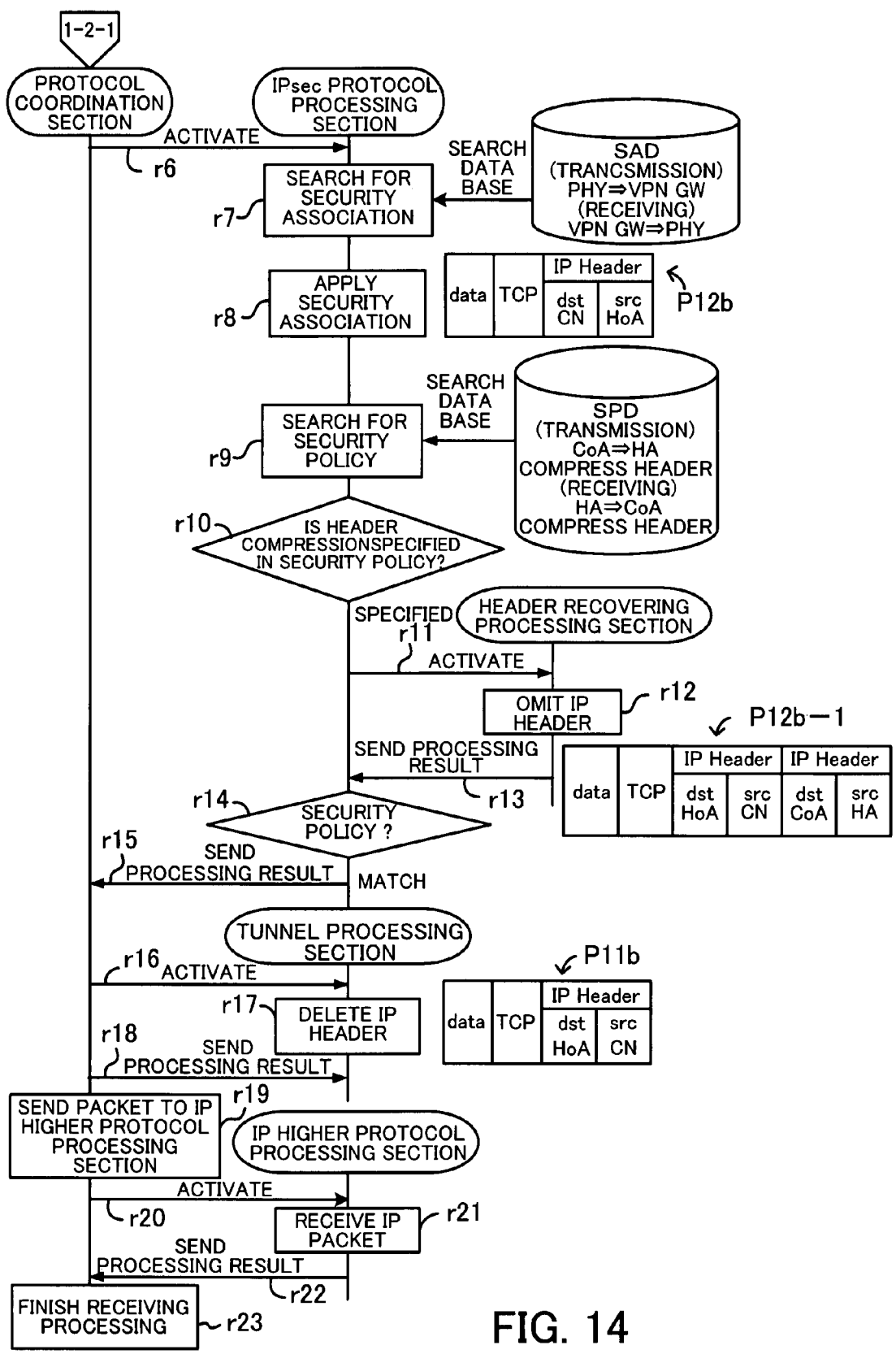
FIG. 14 shows the receiving processing flow of the mobile node.
Figure 15:
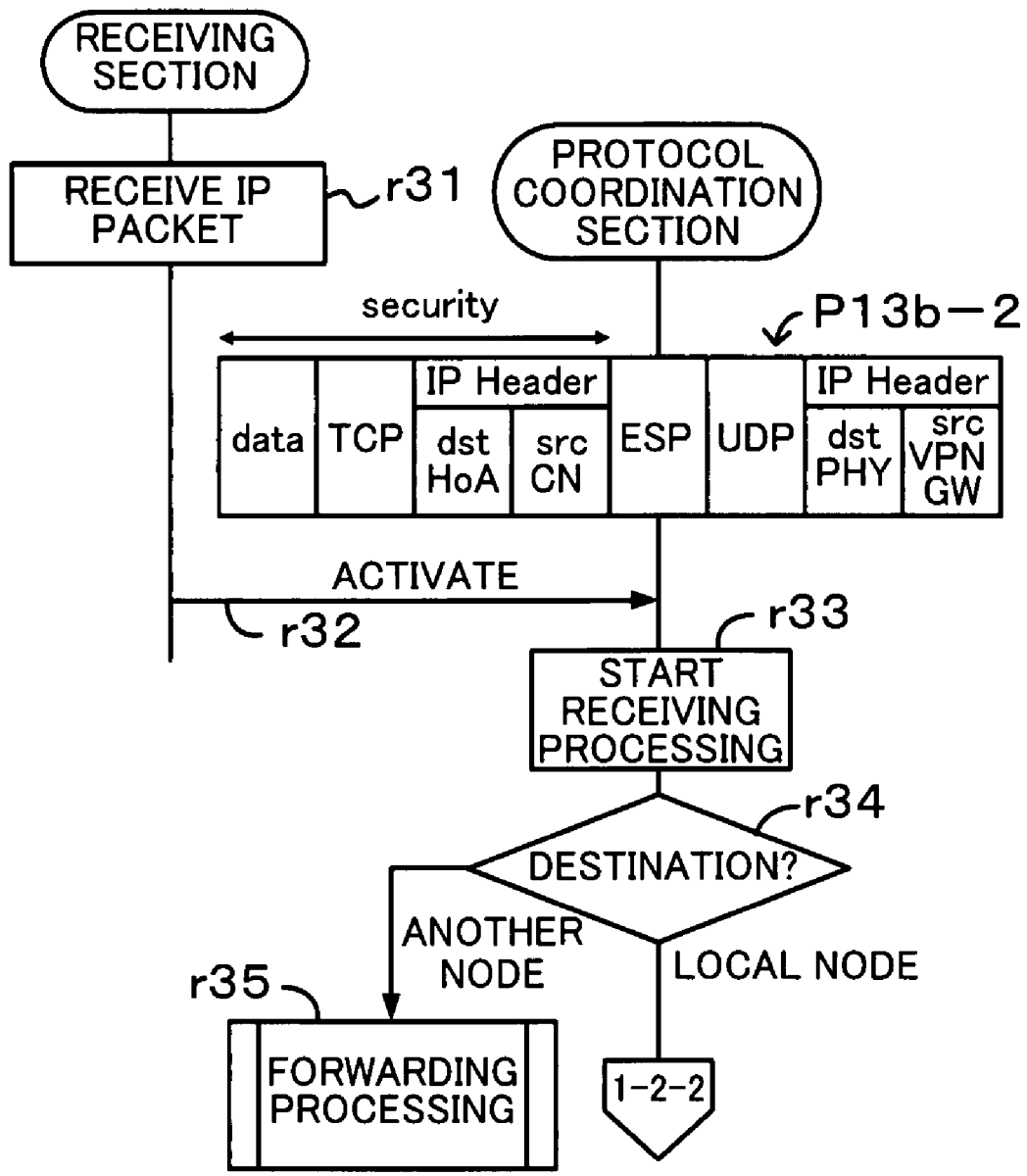
FIG. 15 shows a receiving processing flow of the mobile node.
Figure 16:
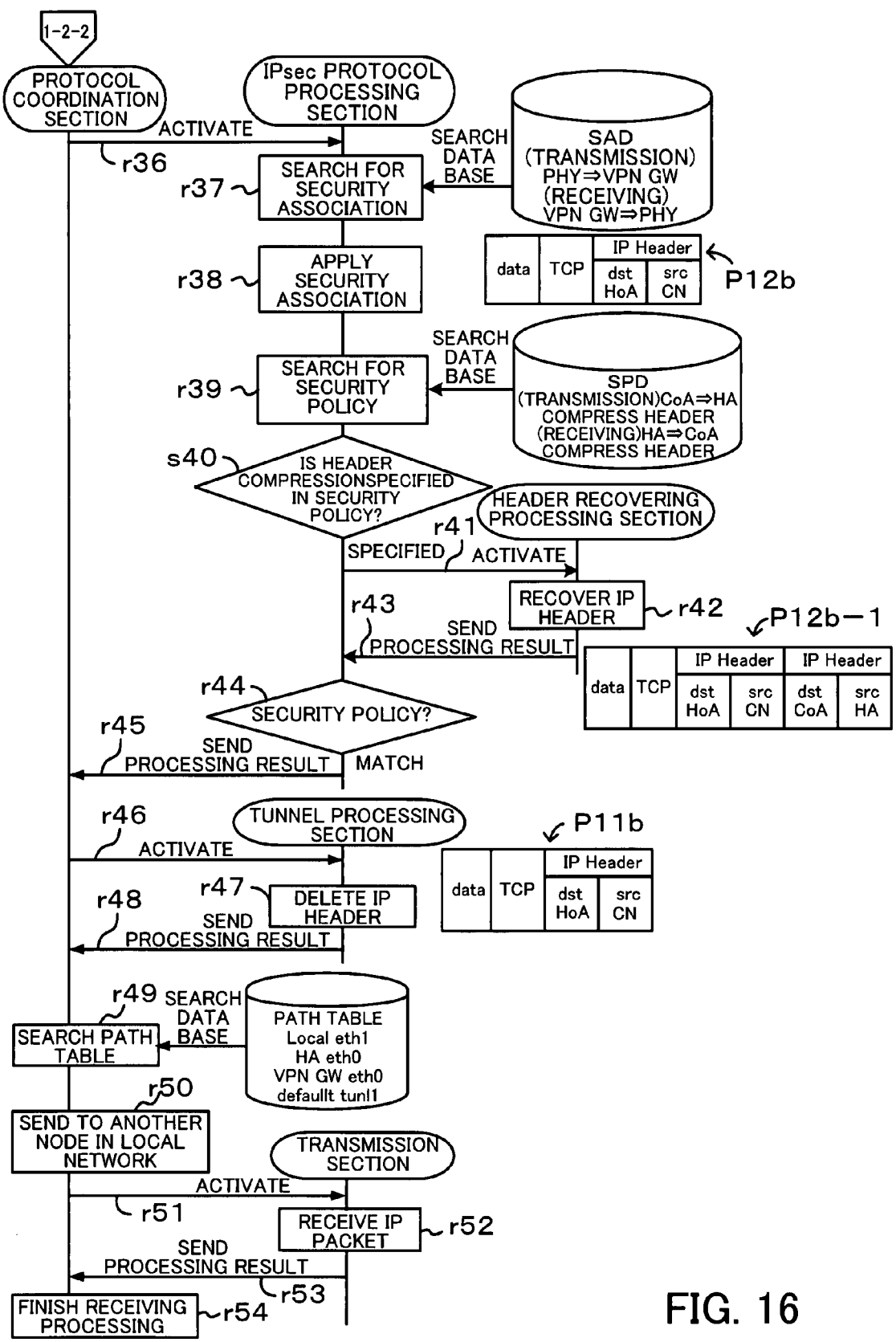
FIG. 16 shows the receiving processing flow of the mobile node.

The receiving-processing operations of the mobile node MN will be described next. FIG. 13 and FIG. 14 show a receiving processing flow (receiving processing flow 1) used in the network structure of the mobile VPN 2 shown in FIG. 2. FIG. 15 and FIG. 16 show a receiving processing flow (receiving processing flow 2) used in the network structure (a case where the NAT 8 is provided) of the mobile VPN 2a shown in FIG. 5.

Receiving Processing Flow 1

FIG. 13 and FIG. 14 show a receiving processing flow of the mobile node MN. The mobile node MN serves as a mobile host.

In FIG. 13, the receiving section I/F1a receives a packet P13b-1 (in step r1) and activates the protocol coordination section 15a (in step r2). The protocol coordination section 15a starts receiving processing (in step r3), and searches for the destination (in step r4). When the destination is another node, the protocol coordination section 15a performs forwarding processing (in step r5). When the destination is the mobile node, the protocol coordination section 15a activates the IPsec protocol processing section 13a (in step r6, shown in FIG. 14).

In FIG. 14, the IPsec protocol processing section 13a searches the SAD 19a for security association (in step r7), and applies corresponding security association to decapsulate the header attached by the IPsec tunnel to generate a packet P12b (in step r8). The IPsec protocol processing section 13a searches the SPD 11a for a security policy (in step r9). When it is recognized that the header has been omitted from the received packet (in step r10), the IPsec protocol processing section 13a activates the header recovering processing section 14a (in step r11). The header recovering processing section 14a recovers the MIP capsulating header to generate a packet 12b-1 (in step r12), and sends the processing result to the IPsec protocol processing section 13a (in step r13). The IPsec protocol processing section 13a checks (in step r14) the security policy for the packet P12b-1 of which the header has been recovered, and sends the check result to the protocol coordination section 15a (in step r15). The protocol coordination section 15a activates the tunnel processing section 16a (in step r16). The tunnel processing section 16a deletes the MIP capsulating header to generate a packet P11b (in step r17), and sends the processing result to the protocol coordination section 15a (in step r18). The protocol coordination section 15a sends the packet P11b to the IP higher protocol processing section 18a (in step r19), and activates the IP higher protocol processing section 18a (in step r20). The IP higher protocol processing section 18a receives the packet P11b (in step r21), and sends the processing result to the protocol coordination section 15a (in step r22) to finish the receiving processing (in step r23).

The receiving processing flow 1 will be summarized below. When the mobile node MN receives an IP packet, the mobile node MN determines from the destination IP address whether to perform receiving processing or forwarding processing.

When the destination of the IP packet is the mobile node MN, the IPsec protocol processing section 13a identifies security association specified in the SAD 19a from the transmission source IP address, the destination IP address, the AH or ESP protocol, and an SPI in the AH or ESP header, and authenticates or decrypts the IP packet.

In the current case, the tunnel mode and AH are used in the security association. Then, a security policy corresponding to the security association is searched for. In the receiving security policy in the SPD 11a, a transmission source IP address of HA, a destination IP address of CoA, and IP-header omission enabled have been specified. Because of the tunnel mode, an IP header having a transmission source IP address of PHY and a destination IP address of VPNGW is decapsulated. The receiving security policy is applied. Since IP-header omission enabled is specified in the SPD 11a, the header recovering processing section 14a recovers an IP header specified in the SPD 11a. More specifically, an IP header having a transmission source IP address of HA and a destination IP address of CoA is recovered. Then, the security policy is checked, MIP tunneling processing is performed, and the packet is sent to the application running on the mobile node MN.

Receiving Processing Flow 2

FIG. 15 and FIG. 16 show a receiving processing flow of the mobile node MN. The mobile node MN serves as a mobile router.

In FIG. 15, the receiving section I/F1a receives a packet P13b-2 (in step r31) and activates the protocol coordination section 15a (in step r32). The protocol coordination section 15a starts receiving processing (in step r33), and searches for the destination (in step r34). When the destination is another node, the protocol coordination section 15a performs forwarding processing (in step r35). When the destination is the mobile node, the protocol coordination section 15a activates the IPsec protocol processing section 13a (in step r36, shown in FIG. 16).

In FIG. 16, the IPsec protocol processing section 13a searches the SAD 19a for security association (in step r37), and applies corresponding security association to decapsulate the header attached by the IPsec tunnel to generate a packet P12b (in step r38). The IPsec protocol processing section 13a searches the SPD 11a for a security policy (in step r39). When it is recognized that the header has been omitted from the received packet (in step r40), the IPsec protocol processing section 13a activates the header recovering processing section 14a (in step r41). The header recovering processing section 14a recovers the MIP capsulating header to generate a packet 12b-1 (in step r42), and sends the processing result to the IPsec protocol processing section 13a (in step r43). The IPsec protocol processing section 13a checks (in step r44) the security policy for the packet P12b-1 of which the header has been recovered, and sends the check result to the protocol coordination section 15a (in step r45). The protocol coordination section 15a activates the tunnel processing section 16a (in step r46). The tunnel processing section 16a deletes the MIP capsulating header to generate a packet P11b (in step r47), and sends the processing result to the protocol coordination section 15a (in step r48). The protocol coordination section 15a searches the path table 15a1 for the path (in step r49), recognizes that the packet is to be sent to another node in the local network 30 (in step r50), and activates the transmission section I/F2a (in step r51). The transmission section I/F2a receives the packet P11b (in step r52), and sends the processing result to the protocol coordination section 15a (in step r53) to finish the receiving processing (in step r54).

Since the security association is applied before the header recovering processing section 14a recovers the IP header in the receiving processing flow 2, the same processing as in the receiving processing flow 1 is possible. In the current case, the tunnel mode is used for the security association, an ESP header is used, and UDP tunneling is used. Since the IP header is recovered after the security association in the IPsec tunnel mode is applied, because the IP header has been recovered at the time of processing such as MIP and path selection, existing processes are not affected.

The operation of the VPN gateway GW will be described next. The operation of the VPN gateway GW in IP packet processing differs between forwarding processing from the home network 20 (network inside the VPN gateway GW) to the Internet 40 (network outside the VPN gateway GW) and forwarding processing from the Internet 40 to the home network 20.

Figure 17:
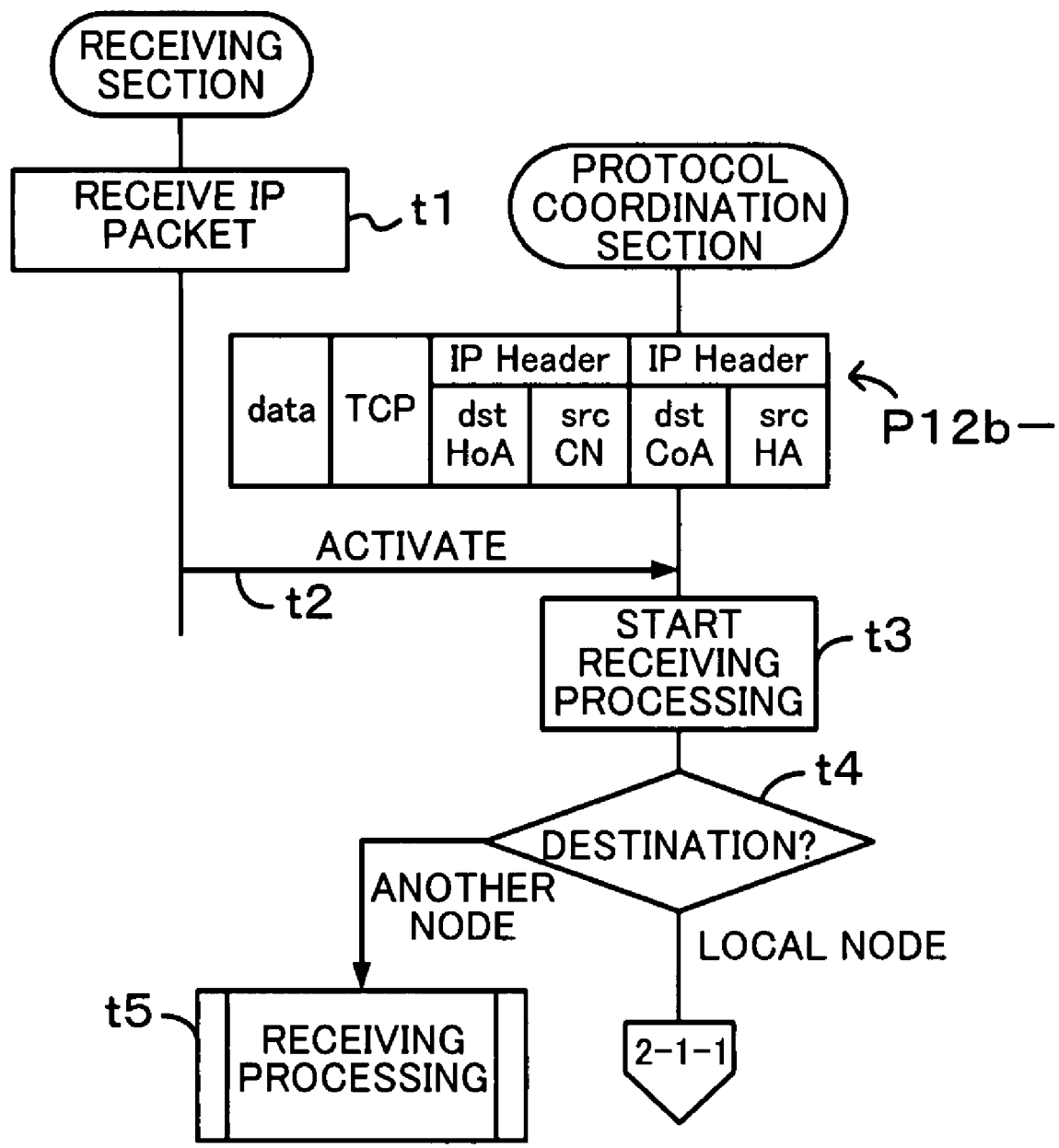
FIG. 17 shows a forwarding processing flow of the VPN gateway.
Figure 18:
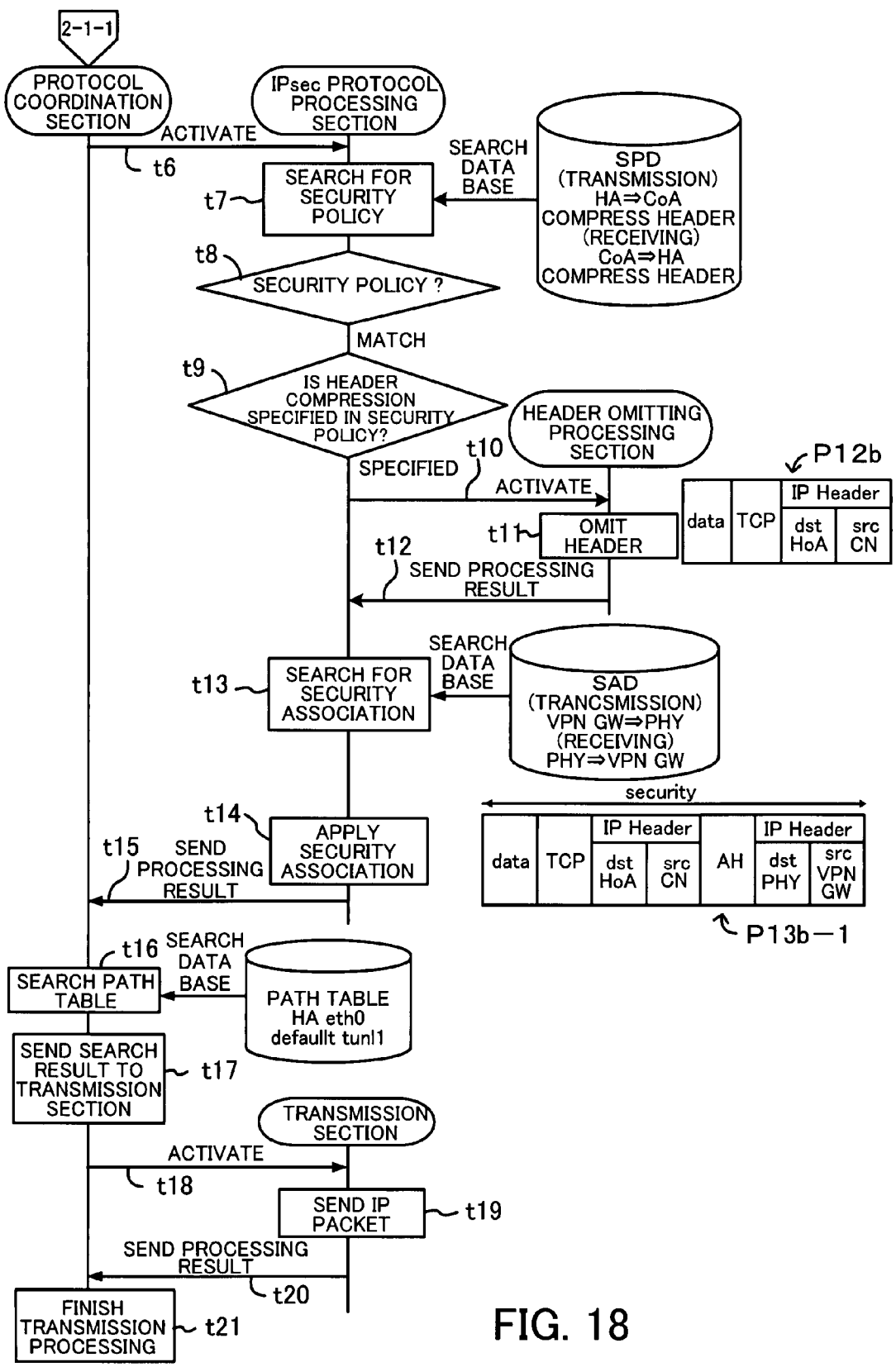
FIG. 18 shows the forwarding processing flow of the VPN gateway.
Figure 19:
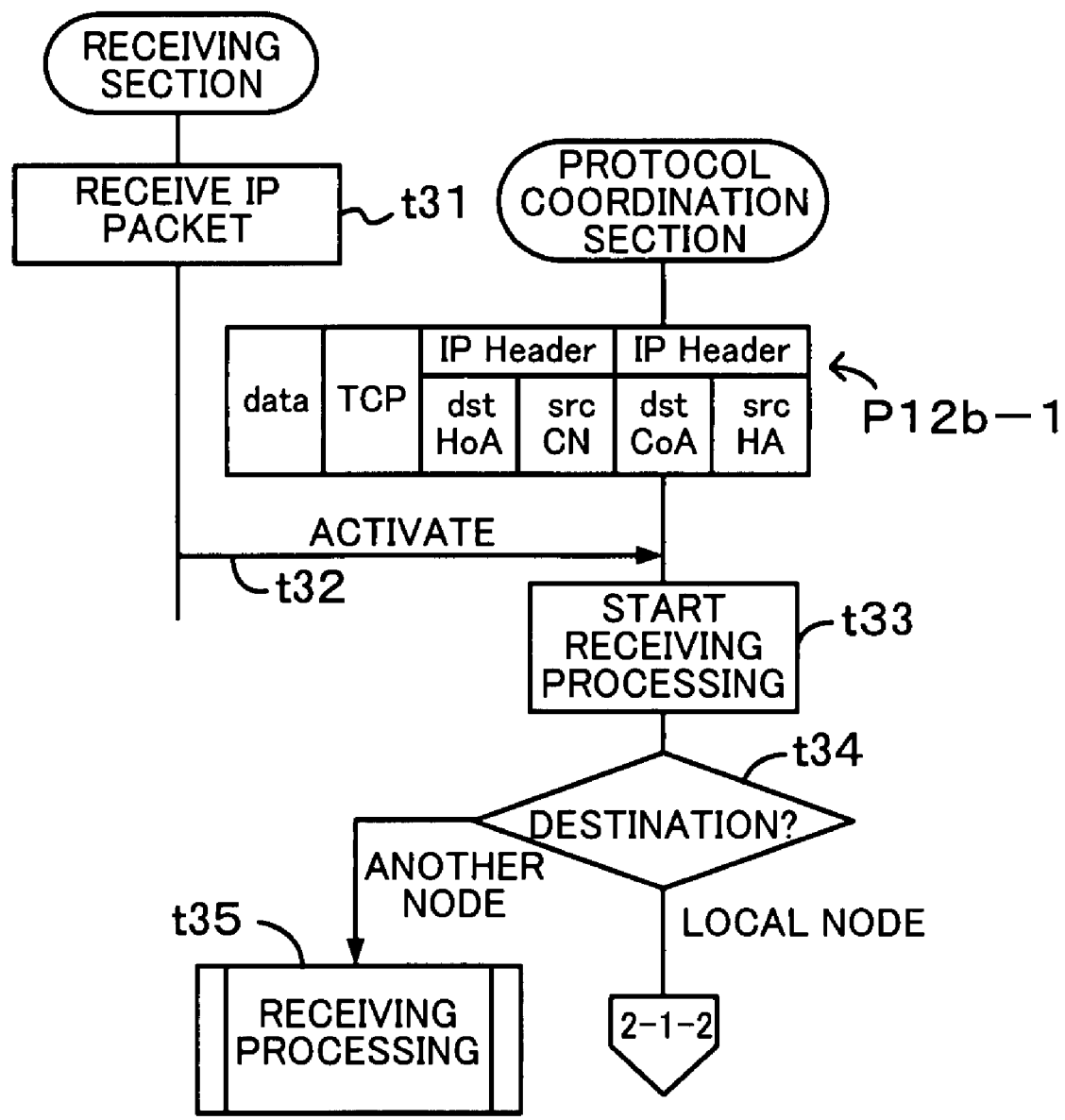
FIG. 19 shows a forwarding processing flow of the VPN gateway.
Figure 20:
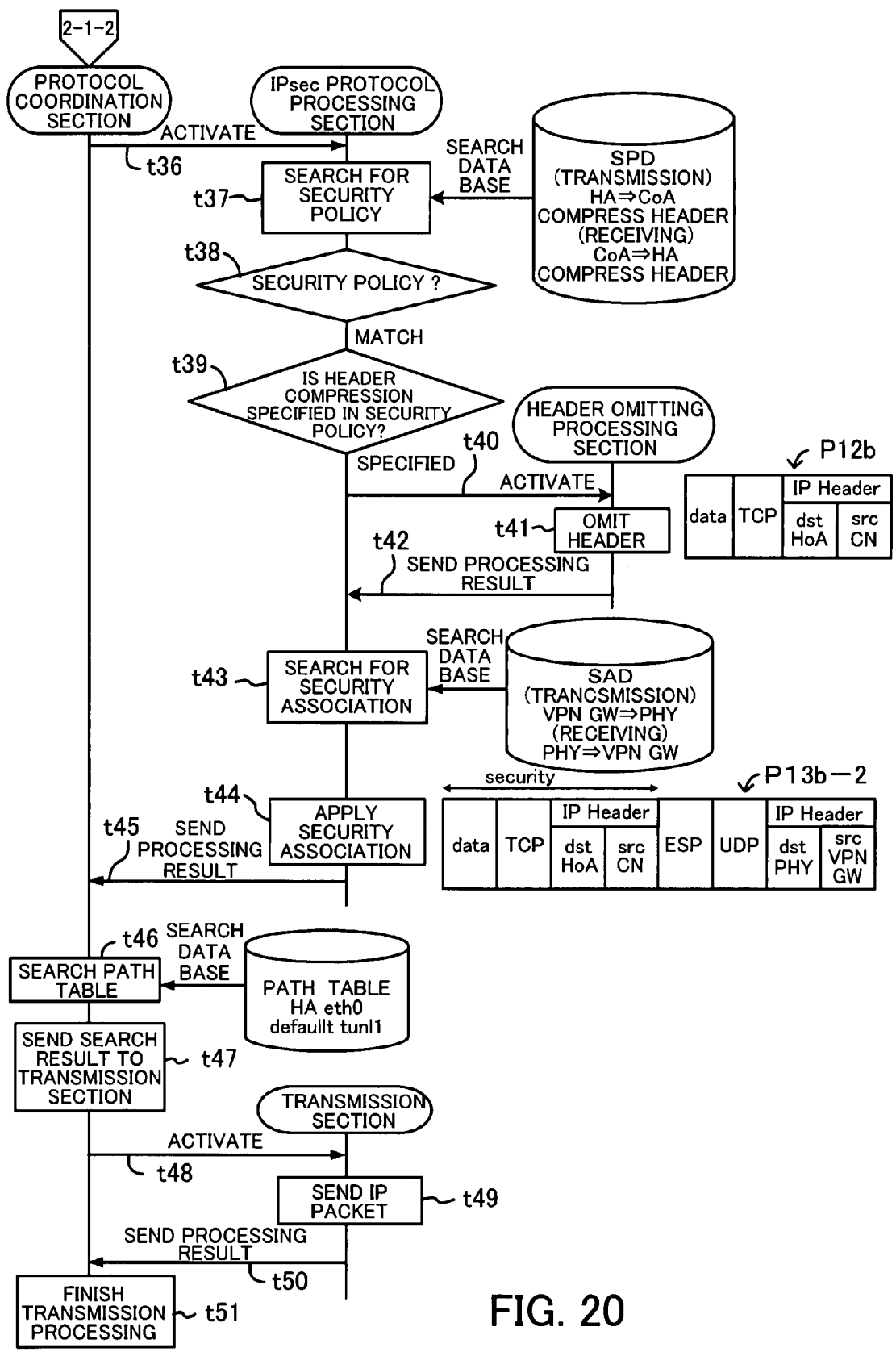
FIG. 20 shows the forwarding processing flow of the VPN gateway.

Forwarding processing from the home network 20 to the Internet 40 will be described first. FIG. 17 and FIG. 18 show a forwarding processing flow (forwarding processing flow 1) used in the network structure of the mobile VPN 2 shown in FIG. 2. FIG. 19 and FIG. 20 show a forwarding processing flow (forwarding processing flow 2) used in the network structure (a case where the NAT 8 is provided) of the mobile VPN 2a shown in FIG. 5.

Forwarding Processing Flow 1

FIG. 17 and FIG. 18 show a forwarding processing flow of the VPN gateway GW.

In FIG. 17, the receiving section I/F1b receives a packet P12b-1 (in step t1) and activates the protocol coordination section 15b (in step t2). The protocol coordination section 15b starts receiving processing (in step t3), and searches for the destination (in step t4). When the destination is the local node, the protocol coordination section 15b performs receiving processing (in step t5). When the destination is another node, the protocol coordination section 15b activates the IPsec protocol processing section 13b (in step t6, shown in FIG. 18).

In FIG. 18, the IPsec protocol processing section 13b searches the SPD 11b for a security policy (in step t7). When the security policy matches (in step t8) and when the security policy specifies header omission (in step t9), the IPsec protocol processing section 13b activates the header omitting processing section 12b (in step t10). The header omitting processing section 12b omits the specified IP header from the packet P12b-1 to generate a packet 12b (in step t11), and sends the processing result to the IPsec protocol processing section 13b (in step t12).

The IPsec protocol processing section 13b searches the SAD 19b for security association (in step t13), and applies corresponding security association to add a security header by the IPsec tunnel and a header for tunnel communication to the packet P12b to generate a packet P13b-1 (in step t14). In the case shown in the figure, the tunneling mode in the AH header is used in the security association. The IPsec protocol processing section 13b sends the processing result to the protocol coordination section 15b (in step t15).

The protocol coordination section 15b uses the path table 15b-1 to perform a path search (in step t16), sends the search result to the transmission section I/F2b (in step t17), and activates the transmission section I/F2b (in step t18). The transmission section I/F2b sends the packet P13b-1 to the outside (in step t19), and sends the processing result to the protocol coordination section 15b (in step t20) to finish the transmission processing (in step t21).

The forwarding processing flow 1 will be summarized below. When the VPN gateway GW receives an IP packet, the VPN gateway GW determines from the destination IP address whether to perform receiving processing or forwarding processing. When the destination of the IP packet is another node, the IPsec protocol processing section 13b searches the SPD 11b and compares the IP packet with the contents of the security policy. The transmission security policy specifies a transmission source address of HA, a destination address of CoA, and IP-header omission enabled. As a result of comparison between the IP packet and the SPD 11b, the transmission security policy is applied, and the header omitting processing section 12b omits the IP header specified in the SPD 11b.

More specifically, an IP header having a transmission source IP address of HA and a destination IP address of CoA is omitted. Then, security association specified in the SAD 19b is identified from the security policy and is applied. In the current case, the tunnel mode and AH are used in the security association. Because of the tunnel mode, capsulation is made with an IP header having a transmission source IP address of VPNGW and a destination IP address of PHY. The IP packet to which the security association has been applied is sent through an interface according to the path table 15b-1.

Forwarding Processing Flow 2

FIG. 19 and FIG. 20 show a forwarding processing flow of the VPN gateway GW.

In FIG. 19, the receiving section I/F1b receives a packet P12b-1 (in step t31) and activates the protocol coordination section 15b (in step t32). The protocol coordination section 15b starts receiving processing (in step t33), and searches for the destination (in step t34). When the destination is the local node, the protocol coordination section 15b performs receiving processing (in step t35). When the destination is another node, the protocol coordination section 15b activates the IPsec protocol processing section 13b (in step t36, shown in FIG. 20).

In FIG. 20, the IPsec protocol processing section 13b searches the SPD 11b for a security policy (in step t37). When the security policy matches (in step t38) and when the security policy specifies header omission (in step t39), the IPsec protocol processing section 13b activates the header omitting processing section 12b (in step t40). The header omitting processing section 12b omits the specified IP header from the packet P12b-1 to generate a packet 12b (in step t41), and sends the processing result to the IPsec protocol processing section 13b (in step t42).

The IPsec protocol processing section 13b searches the SAD 19b for security association (in step t43), and applies corresponding security association to add a security header by the IPsec tunnel and a header for tunnel communication to the packet P12b to generate a packet P13b-2 (in step t44). In the case shown in the figure, the tunneling mode in the ESP header is used in the security association. The IPsec protocol processing section 13b sends the processing result to the protocol coordination section 15b (in step t45).

The protocol coordination section 15b uses the path table 15b-1 to perform a path search (in step t46), sends the search result to the transmission section I/F2b (in step t47), and activates the transmission section I/F2b (in step t48). The transmission section I/F2b sends the packet P13b-2 to the outside (in step t49), and sends the processing result to the protocol coordination section 15b (in step t50) to finish the transmission processing (in step t51).

Since the IP header is omitted by the header omitting processing section 12b, and then the security association is applied in the forwarding processing flow 2, the same processing as in the transmission processing flow 1 is possible. In the current case, the tunnel mode is used for the security association, an ESP header is used as a security header, and UDP tunneling is used for tunnel communication. Since the IP header is omitted before the security association in the IPsec tunnel mode is applied, existing processes such as path selection after the security association is applied are not affected.

Figure 21:
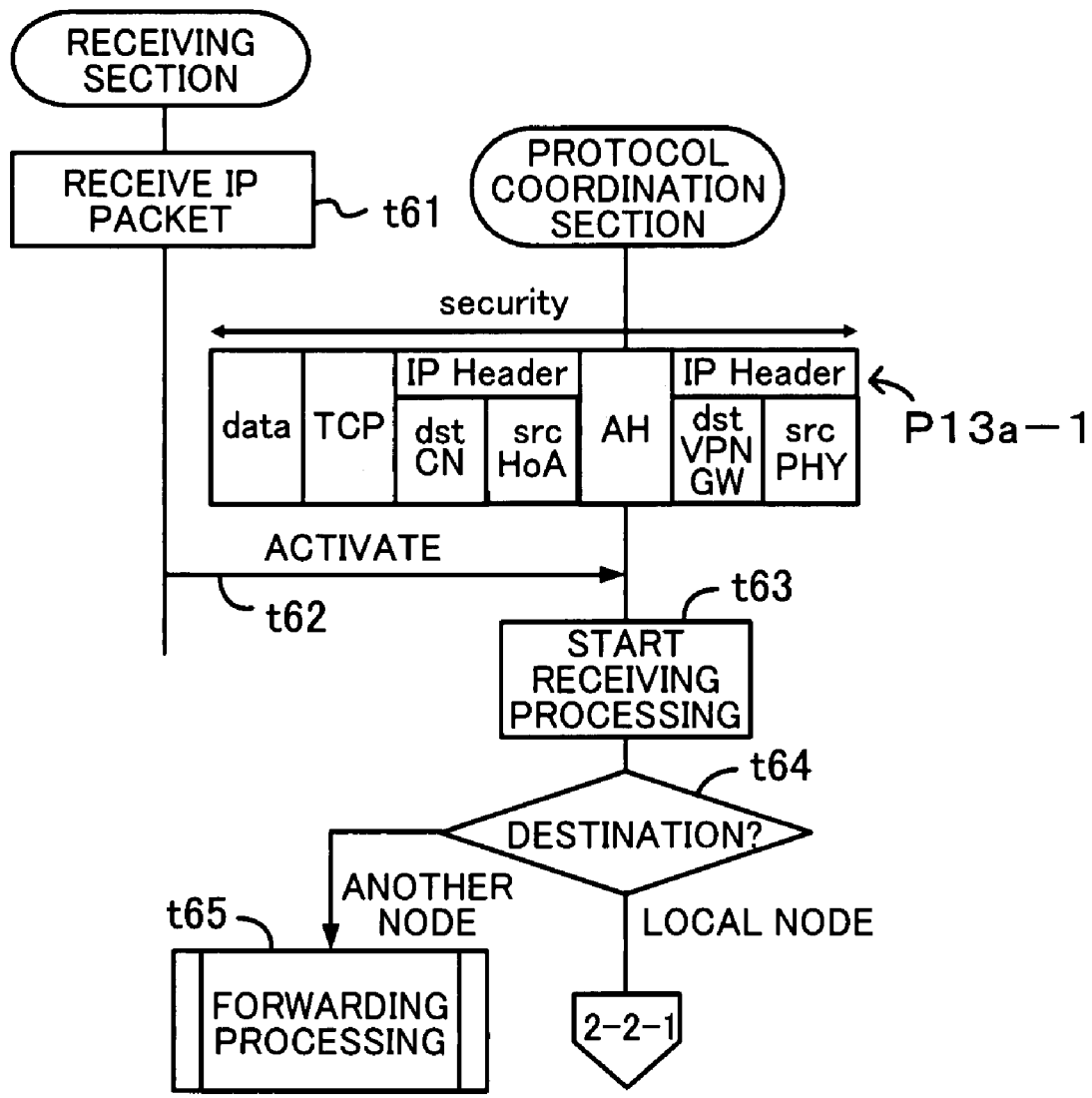
FIG. 21 shows a forwarding processing flow of the VPN gateway.
Figure 22:
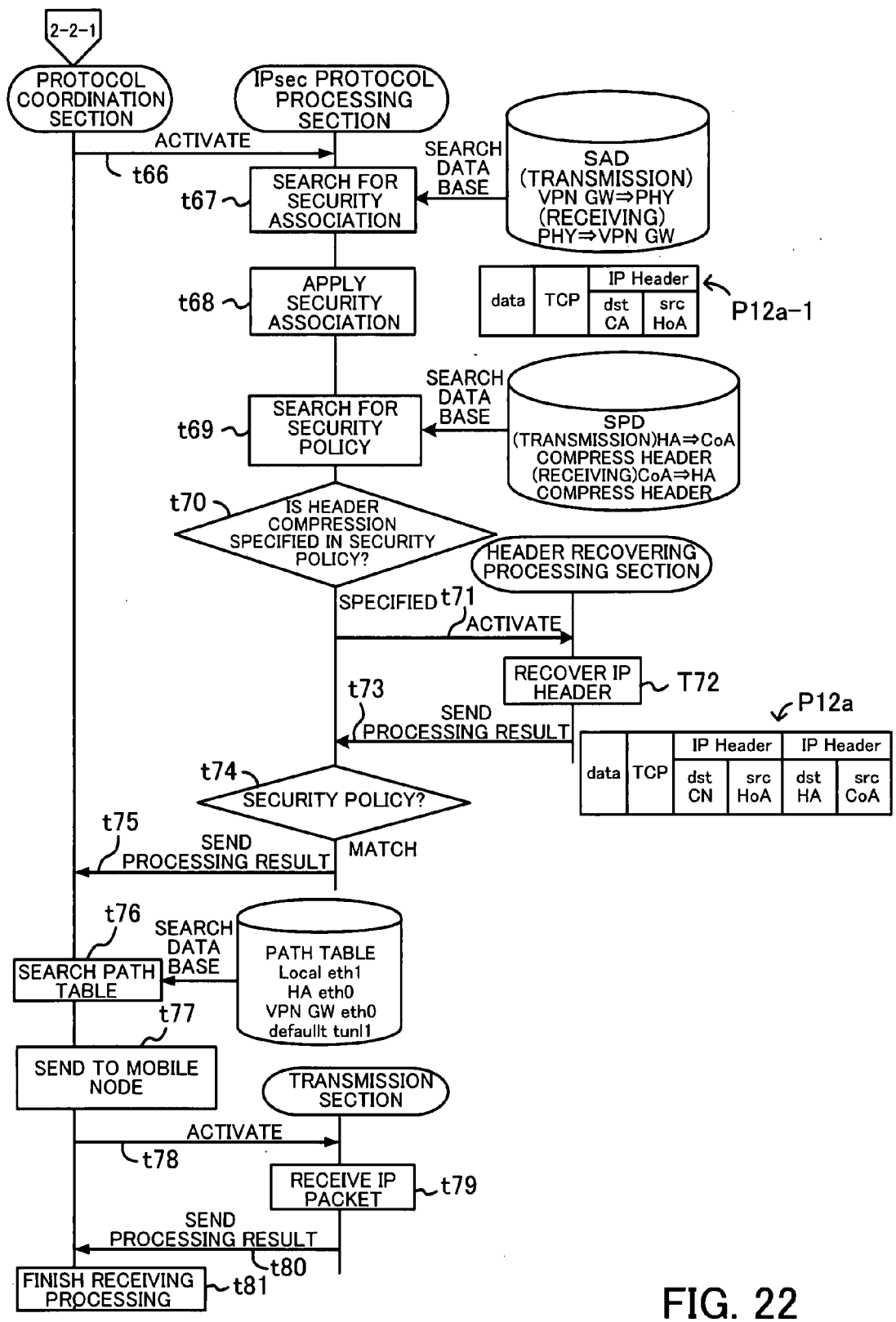
FIG. 22 shows the forwarding processing flow of the VPN gateway.
Figure 23:
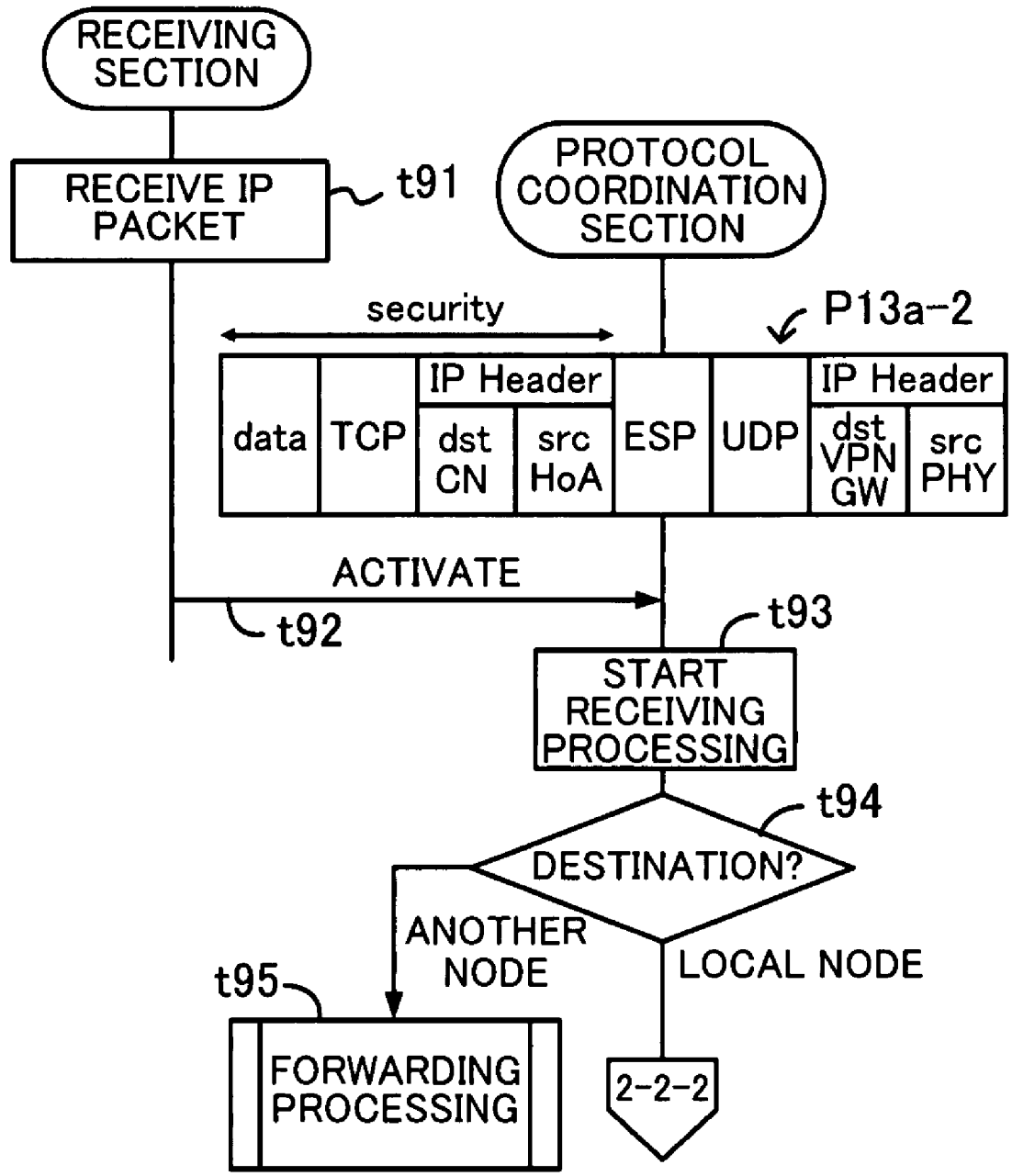
FIG. 23 shows a forwarding processing flow of the VPN gateway.
Figure 24:
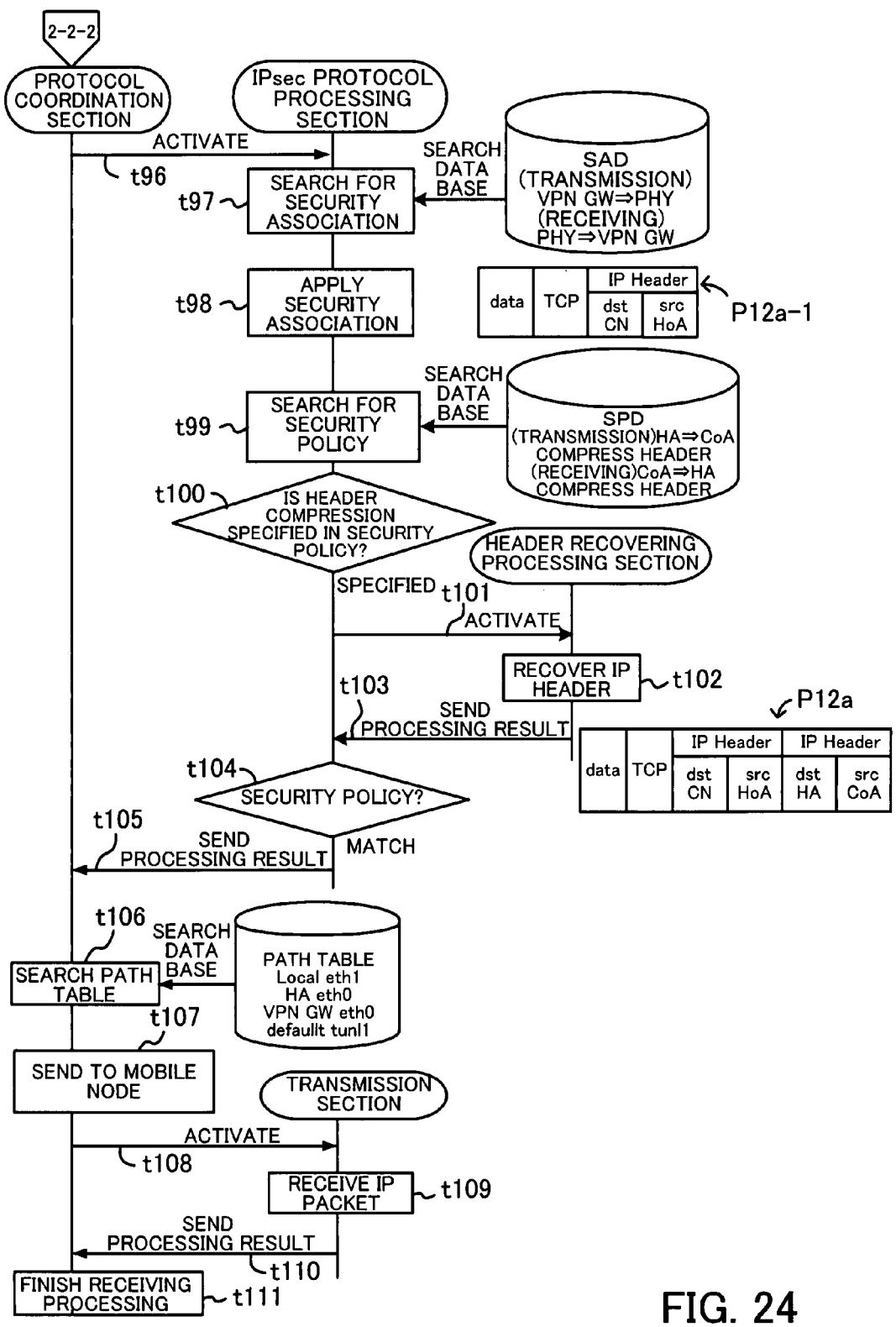
FIG. 24 shows the forwarding processing flow of the VPN gateway.

Forwarding processing from the Internet 40 to the home network 20 will be described next. FIG. 21 and FIG. 22 show a forwarding processing flow (forwarding processing flow 3) used in the network structure of the mobile VPN 2 shown in FIG. 2. FIG. 23 and FIG. 24 show a forwarding processing flow (forwarding processing flow 4) used in the network structure (a case where the NAT 8 is provided) of the mobile VPN 2a shown in FIG. 5.

Forwarding Processing Flow 3

FIG. 21 and FIG. 22 show a forwarding processing flow of the VPN gateway GW.

In FIG. 21, the receiving section I/F1b receives a packet P13a1 (in step t61) and activates the protocol coordination section 15b (in step t62). The protocol coordination section 15b starts receiving processing (in step t63), and searches for the destination (in step t64). When the destination is another node, the protocol coordination section 15b performs forwarding processing (in step t65). When the destination is the local node, the protocol coordination section 15b activates the IPsec protocol processing section 13b (in step t66, shown in FIG. 22).

In FIG. 22, the IPsec protocol processing section 13b searches the SAD 19b for security association (in step t67), and applies corresponding security association to decapsulate the header attached by the IPsec tunnel to generate a packet P12a1 (in step t68). The IPsec protocol processing section 13b searches the SPD 11b for a security policy (in step t69). When it is recognized that the header has been omitted from the received packet (in step t70), the IPsec protocol processing section 13b activates the header recovering processing section 14b (in step t71). The header recovering processing section 14b recovers the MIP capsulating header to generate a packet 12a (in step t72), and sends the processing result to the IPsec protocol processing section 13b (in step t73). The IPsec protocol processing section 13b checks (in step t74) the security policy for the packet P12a of which the header has been recovered, and sends the check result to the protocol coordination section 15b (in step t75). The protocol coordination section 15b searches the path table 15b-1 for the path (in step t76), recognizes that the packet is to be sent to the mobile node MN (in step t77), and activates the transmission section I/F2b (in step t78). The transmission section I/F2b receives the packet P12a (in step t79), and sends the processing result to the protocol coordination section 15b (in step t80) to finish the receiving processing (in step t81).

The forwarding processing flow 3 will be summarized below. When the VPN gateway GW receives an IP packet, the VPN gateway GW determines from the destination IP address whether to perform receiving processing or forwarding processing. When the destination of the IP packet is the local node, the IPsec protocol processing section 13b identifies security association specified in the SAD 19b from the transmission source IP address, the destination IP address, the AH or ESP protocol, and an SPI in the AH or ESP header, and authenticates or decrypts the IP packet.

In the current case, the tunnel mode and AH are used in the security association. Then, a security policy corresponding to the security association is searched for. In a receiving security policy in the SPD 11b, a transmission source IP address of CoA, a destination IP address of HA, and IP-header omission enabled have been specified. Because of the tunnel mode, an IP header having a transmission source IP address of PHY and a destination IP address of VPNGW is decapsulated. The receiving security policy is applied. The header recovering processing section 14b recovers an IP header specified in the SPD 11b. More specifically, an IP header having a transmission source IP address of CoA and a destination IP address of HA is recovered. Then, the security policy is checked, and the packet is sent through an interface according to the path table 15b-1.

Forwarding Processing Flow 4

FIG. 23 and FIG. 24 show a forwarding processing flow of the VPN gateway GW.

In FIG. 23, the receiving section I/F1b receives a packet P13a-2 (in step t91) and activates the protocol coordination section 15b (in step t92). The protocol coordination section 15b starts receiving processing (in step t93), and searches for the destination (in step t94). When the destination is another node, the protocol coordination section 15b performs forwarding processing (in step t95). When the destination is the local node, the protocol coordination section 15b activates the IPsec protocol processing section 13b (in step t96, shown in FIG. 24).

In FIG. 24, the IPsec protocol processing section 13b searches the SAD 19b for security association (in step t97), and applies corresponding security association to decapsulate the header attached by the IPsec tunnel to generate a packet P12a1 (in step t98). The IPsec protocol processing section 13b searches the SPD 11b for a security policy (in step t99). When it is recognized that the header has been omitted from the received packet (in step t100), the IPsec protocol processing section 13b activates the header recovering processing section 14b (in step t101). The header recovering processing section 14b recovers the MIP capsulating header to generate a packet 12a (in step t102), and sends the processing result to the IPsec protocol processing section 13b (in step t103). The IPsec protocol processing section 13b checks (in step t104) the security policy for the packet P12a of which the header has been recovered, and sends the check result to the protocol coordination section 15b (in step t105). The protocol coordination section 15b searches the path table 15b-1 for the path (in step t106), recognizes that the packet is to be sent to the mobile node MN (in step t107), and activates the transmission section I/F2b (in step t108). The transmission section I/F2b receives the packet P12a (in step t109), and sends the processing result to the protocol coordination section 15b (in step t110) to finish the receiving processing (in step t111).

Since the security association is applied before the header recovering processing section 14b recovers the IP header in the forwarding processing flow 4, the same processing as in the forwarding processing flow 3 is possible. In the current case, the tunnel mode is used for the security association, an ESP header is used, and UDP tunneling is used. Since the IP header is recovered when the IP packet in the IPsec tunnel mode is authenticated and decrypted, or when the IP packet is authenticated or decrypted, because the IP header has been recovered at the time of processing such as path selection, existing processes are not affected.

The structure of an SPD will be described next. FIG. 25 shows an example structure of the SPD 11a. Information specified in the SPD 11a of the mobile node MN is shown. The SPD 11a includes items of a transmission source IP address, a transmission source IP net mask, a destination IP address, a destination IP net mask, mode, a tunnel transmission source IP address, a tunnel destination IP address, a protocol, an SPI, and header omission ON/OFF.

In the figure, as a transmission security policy, a transmission source IP address of CoA, a transmission source IP net mask of 32, a destination IP address of HA, a destination IP net mask of 32, a mode of tunnel, a tunnel transmission source IP address of PHY, a tunnel destination IP address of VPNGW, a protocol of AH, an SPI of 1032, and header omission ON are specified.

Therefore, when the MIP capsulating header of a transmission packet has a transmission source of CoA and a destination of HA, the header omitting processing section 12a of the mobile node MN deletes the capsulating header, which has a transmission source of CoA and a destination of HA, according to the setting of the transmission security policy.

In the figure, as a receiving security policy, a transmission source IP address of HA, a transmission source IP net mask of 32, a destination IP address of CoA, a destination IP net mask of 32, a mode of tunnel, a tunnel transmission source IP address of VPNGW, a tunnel destination IP address of PHY, a protocol of AH, an SPI of 5312, and header omission ON are specified.

Therefore, when a received packet has a tunnel transmission source of VPNGW and a tunnel destination of PHY, it is understood that an MIP capsulating header having a transmission source of HA and a destination of CoA is omitted. When the header recovering processing section 14a of the mobile node MN receives such a packet, it recovers the capsulating header, which has a transmission source of HA and a destination of CoA, according to the setting of the receiving security policy.

Next, an operation in a first embodiment where Mobile IPv6 (RFC 3775) is applied to the network structure shown in FIG. 2, to which draft-ietf-mip4-vpn-problem-solution-01 has been applied. The mobile node MN serves as a mobile host.

The mobile node MN uses a Binding Update message and a Binding Acknowledgement message both defined in Mobile IPv6 (RFC 3775) to perform binding registration of CoA and HA at the home agent 21. (The Binding Update message is a position registration message.)

Figure 26:
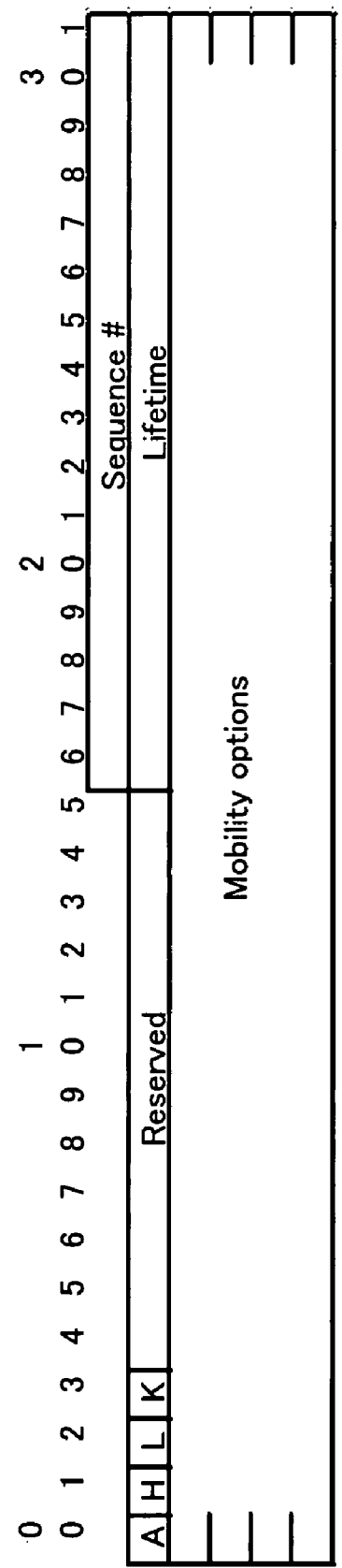
FIG. 26 shows the format of a Binding Update message.

FIG. 26 shows the format of the Binding Update message. Each field will be described below.

Sequence #: Serial number used by the receiving node to arrange Binding Update messages in order and by the transmission node to make pairs of Binding Update messages and Binding Acknowledgement messages.

Acknowledgement "A": This acknowledgement bit "A" is set when the mobile node requests the transmission of a Binding Acknowledgement message at the reception of a binding update.

Home Registration "H": This home registration bit "H" is set by the mobile node to request that the receiving node be the home agent.

Link-Local Address Compatibility "L": This link-local address compatibility bit "L" is set when the home address reported by the mobile node has the same interface identifier as the link-local address of the mobile node.

Key Management Mobility Capability "K": This key management mobility capability bit "K" is set when a protocol for establishing IPsec security association between the mobile node and the home agent as movement is used. When manual IPsec setting is used, this bit is cleared.

Reserved: Not yet used.

Lifetime: The number of unit times until the period of coupling expires. When this field is set to zero, it means that the coupling cash item of the mobile node has been deleted.

Mobility Options: Variable length field where the complete mobile header length is a multiple of eight octets. This field includes a mobile option encoded by a TVL of zero or more. Effective options in a Binding Update message are a Binding Authorization Data option (this option is required in a Binding Update message sent to a transaction destination node), a Nonce Indices option, and an Alternate Care of Address option.

Figure 27:
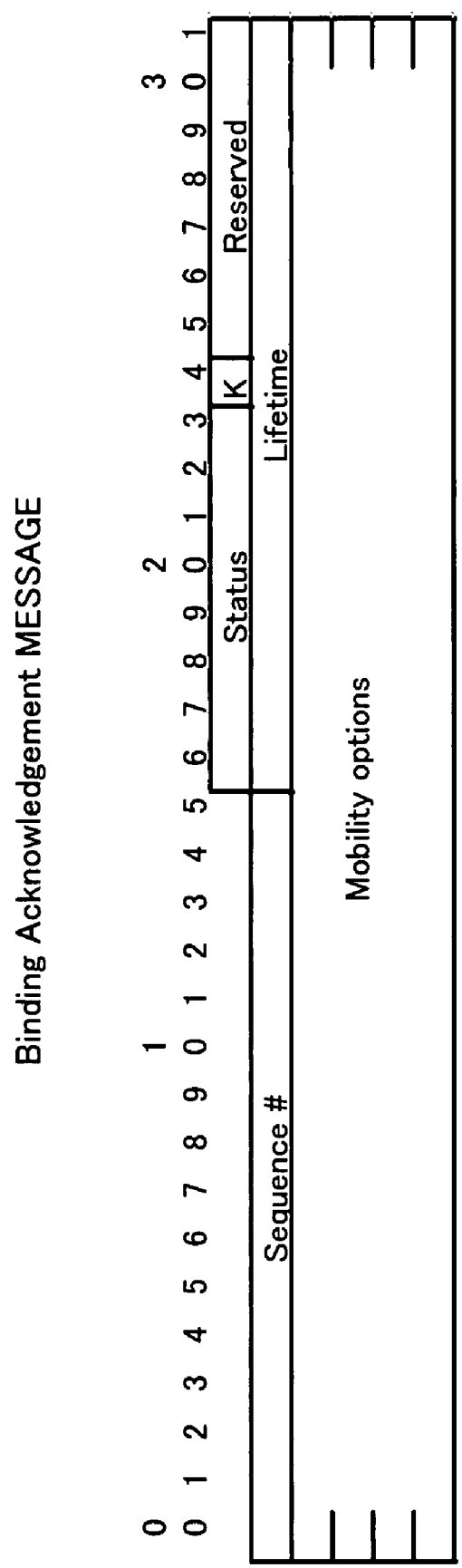
FIG. 27 shows the format of a Binding Acknowledgement message.

FIG. 27 shows the format of the Binding Acknowledgement message. Each field will be described below.

Key Management Mobility Capability "K": This key management mobility capability bit "K" is set when a protocol for establishing IPsec security association between the mobile node and the home agent as movement is used. When manual IPsec setting is used, this bit is cleared.

Reserved: Not yet used.

Status: Shows the status of the binding update. When this field has a value less than 128, it means that the receiving node has accepted the binding update. When this field has a value equal to or more than 128, it means that the receiving node has rejected the binding update.

Sequence #: This sequence number (for the Binding Acknowledgement message) is copied from the sequence number field of the corresponding Binding Update message. This field is used by the mobile node to associate this Binding Acknowledgement message with a Binding Update message not yet processed.

Lifetime: The number of unit times until the period of coupling expires.

Mobility Options: Variable length field where the complete mobile header length is a multiple of eight octets. This field includes a mobile option encoded by a TVL of zero or more. Effective options in a Binding Update message are a Binding Authorization Data option (this option is required in a Binding Update message sent to a transaction destination node), and a Binding Refresh Advice option.

With these messages, the home agent 21 can forward an IP packet sent from the mobile node MN to the communication terminal 6, or can forward an IP packet whose destination is the mobile node MN. When the mobile node MN completes registering the position at the home agent 21, the mobile node MN specifies MIP tunneling and an IPsec security policy and IPsec security association. For MIP tunneling, a transmission source IP address of CoA and a destination IP address of HA are specified.

For an IPsec transmission security policy, a transmission source IP address of CoA, a destination IP address of HA, and IP-header omission enabled are specified. For an IPsec receiving security policy, a transmission source IP address of HA, a destination IP address of CoA, and IP-header omission enabled are specified.

According to draft-ietf-mip4-vpn-problem-solution-01, binding registration at the home agent 21 is performed by a combination of CoA and HA. Whereas PHY is changed as the mobile node MN moves, since the IP addresses CoA and HA do not change irrespective of the movement of the mobile node MN, MIP handover does not occur.

An IPsec security policy is also specified by a combination of CoA and HA. Therefore, the security policy does not need to be re-arranged as the mobile node MN moves. When the mobile node MN moves, only IPsec security association, which is specified by a combination of PHY and VPNGW, needs to be updated.

The IPsec transmission security policy is used when the IP header is omitted. The IPsec receiving security policy is used when the IP header is recovered. Usually, the IPsec security association is automatically specified by algorithms for Internet key exchange (IKE) such as algorithms for Internet key exchange version 1 (IKEv1) in RFC 4109. With these procedures, the SAD and SPD are specified.

In contrast, the VPN gateway GW specifies IPsec security policies and security association. In the IPsec transmission security policy, a transmission source IP address of HA, a destination IP address of CoA, and IP-header omission enabled are specified.

In the IPsec receiving security policy, a transmission source IP address of CoA, a destination IP address of HA, and IP-header omission enabled are specified. The IPsec transmission security policy is used when the IP header is omitted. The IPsec receiving security policy is used when the IP header is recovered. The IPsec security policies may be specified in advance by an administrator, or may be dynamically specified in coordination with IPsec-DHCP and others. The IPsec security association may be specified by IKE or others. With these procedures, the SAD and SPD are specified.

When MIP position registration is finished, security policies are specified, and security association is established, IP packets are exchanged through the VPN with their IP headers omitted, according to the present invention.

Communication from the mobile node MN to the communication terminal 6 will be described next. The mobile node MN performs processing corresponding to the transmission processing flow 1, and the VPN gateway GW performs processing corresponding to the forwarding processing flow 3. When an IP packet is sent from the mobile node MN, it is processed by the MIP mechanism to have the packet format shown in (2) of FIG. 4. This packet corresponds to a transmission security policy having a transmission source IP address of CoA and a destination IP address of HA, specified in the SPD. Since IP-header omission enabled is specified in this transmission security policy, the header omitting processing section 12a omits an IP header having the IP addresses corresponding to the security policy.

The IPsec protocol processing section 13a applies security association specified in the SAD 19a to the IP packet from which the IP header has been omitted. More specifically, the IP packet is authenticated (AH) or encrypted (ESP), and is capsulated (in the tunnel mode) with an IP header having a transmission source IP address of PHY and a destination IP address of VPNGW to have the packet format shown in (1) of FIG. 4, and is sent to the VPN gateway GW. Since encryption or authentication is applied when the IP header is omitted, the whole of the IP packet to be sent can be a target of encryption or authentication in the same way as in usual IPsec processing. An encryption algorithm or an authentication algorithm originally supported by IPsec can be applied.

The VPN gateway GW receives the IP packet having the format shown in (1) of FIG. 4, and determines whether the destination of the IP packet is the local node. When the destination of the IP packet is the local node, the VPN gateway GW analyzes the IP packet. When an AH header or an ESP header is detected in the IP packet, security association is identified from the transmission source IP address and the destination IP address in the IP header, the AH or ESP protocol, and an SPI in the AH header or ESP header, and is applied.

More specifically, the IP packet is authenticated (AH) or encrypted (ESP), and is decapsulated (in the tunnel mode) with an IP header having a transmission source IP address of PHY and a destination IP address of VPNGW. A corresponding security policy is identified from the security association. When IP-header omission enabled is specified, the IP header (shown in (2) of FIG. 4) is recovered with the transmission source IP address and the destination IP address specified in the security policy, and the security policy is checked. The IP packet having the format shown in (2) of FIG. 4 is sent to the home agent 21 according to the path table 15b-1. Since encryption or authentication is applied when the IP header is omitted, the whole of the IP packet to be received can be a target of encryption or authentication in the same way as in usual IPsec processing. An encryption algorithm or an authentication algorithm originally supported by IPsec can be applied.

The home agent 21 receives the IP packet having the format shown in (2) of FIG. 4, decapsulates the MIP tunneling header by the MIP mechanism, and sends the IP packet having the format shown in (3) of FIG. 4 to the communication terminal 6.

Communication from the communication terminal 6 to the mobile node MN will be described next. The mobile node MN performs processing corresponding to the receiving processing flow 1, and the VPN gateway GW performs processing corresponding to the forwarding processing flow 1.

The communication terminal 6 sends an IP packet shown in (4) of FIG. 4. Since the destination address of HoA of the IP packet is the address of the home agent 20, the MIP mechanism forwards the IP packet to the home agent 21 through various networks. The home agent 21 detects binding registration from the destination IP of the forwarded IP packet, and capsulates the IP packet to have the format shown in (5) of FIG. 4. The home agent 21 sends the IP packet to the VPN gateway GW according to the path table 15*b*–1.

The VPN gateway GW receives the IP packet shown in (5) of FIG. 4 and determines whether the destination of the IP packet is the local node. When the destination is another node, the VPN gateway GW performs forwarding processing. In the forwarding processing, the IP packet is compared with the contents of a security policy. It matches a transmission security policy having a transmission source IP address of HA and a destination IP address of CoA, specified in the SPD 11*b*. In the transmission security policy, IP-header omission enabled is specified. Therefore, the header omitting processing section 12*b* omits an IP header having the IP addresses matching those in the security policy. The IPsec protocol processing section 13*b* applies security association specified in the SAD 19*b* to the IP packet from which the IP header has been omitted.

More specifically, the IP packet is authenticated (AH) or encrypted (ESP), and is capsulated (in the tunnel mode) with an IP header having a transmission source IP address of VPNGW and a destination IP address of PHY to have the packet format shown in (6) of FIG. 4, and is sent to the mobile node MN. Since encryption or authentication is applied when the IP header is omitted, the whole of the IP packet to be sent can be a target of encryption or authentication in the same way as in usual IPsec processing. An encryption algorithm or an authentication algorithm originally supported by IPsec can be applied.

The mobile node MN receives the IP packet having the format shown in (6) of FIG. 4, and determines whether the destination of the IP packet is the local node. When the destination of the IP packet is the local node, the mobile node MN analyzes the IP packet. When an AH header or an ESP header is detected in the IP packet, security association is identified from the transmission source IP address and the destination IP address in the IP header, the AH or ESP protocol, and an SPI in the AH header or ESP header, and is applied.

More specifically, the IP packet is authenticated (AH) or encrypted (ESP), and is decapsulated (in the tunnel mode) with an IP header having a transmission source IP address of VPNGW and a destination IP address of PHY. A corresponding security policy is identified from the security association. When IP-header omission enabled is specified, the IP header (shown in (5) of FIG. 4) is recovered with the transmission source IP address and the destination IP address specified in the security policy, and the security policy is checked. Since encryption or authentication is applied when the IP header is omitted, the whole of the IP packet to be received can be a target of encryption or authentication in the same way as in usual IPsec processing. An encryption algorithm or an authentication algorithm originally supported by IPsec can be applied. The mobile node MN decapsulates the MIP tunneling header by the MIP mechanism, and sends the IP packet to the application.

As described above, since an IP header is omitted to change IP-header triple capsulation to double capsulation between the mobile node MN and the VPN gateway GW, the size of the IP packet to be transmitted is reduced by 40 bytes, which is the size of the IP header.

Since the communication terminal 6 recognizes the mobile node MN by HoA in this way, even when the mobile node MN moves, seamless communication is possible. Secure communication is possible between the mobile node MN and the VPN gateway GW by a VPN using IPsec. In a VPN using IPsec, since an IP header is omitted, network resources can be used effectively. In addition, since an IP header is omitted, encryption or authentication is applied when the IP header is omitted. Therefore, impersonation as the home agent and sniffing caused by the installation of a malicious home agent can be prevented, and sniffing and tampering of an IP packet are effectively suppressed. Since encryption and decryption are performed when a header is compressed, it is not necessary to take header compression into account. An encryption algorithm and a decryption algorithm originally supported by IPsec can be applied as is.

Next, an operation in a second embodiment where Mobile IPv4 (RFC 3344) is applied to the network structure shown in FIG. 5, to which draft-ietf-mip4-vpn-problem-solution-01 has been applied. The mobile node MN serves as mobile router.

The mobile node MN uses a Registration Request message and a Registration Reply message both defined in Mobile IPv4 (RFC 3344) to perform binding registration of CoA and HA at the home agent 21.

Figure 28:
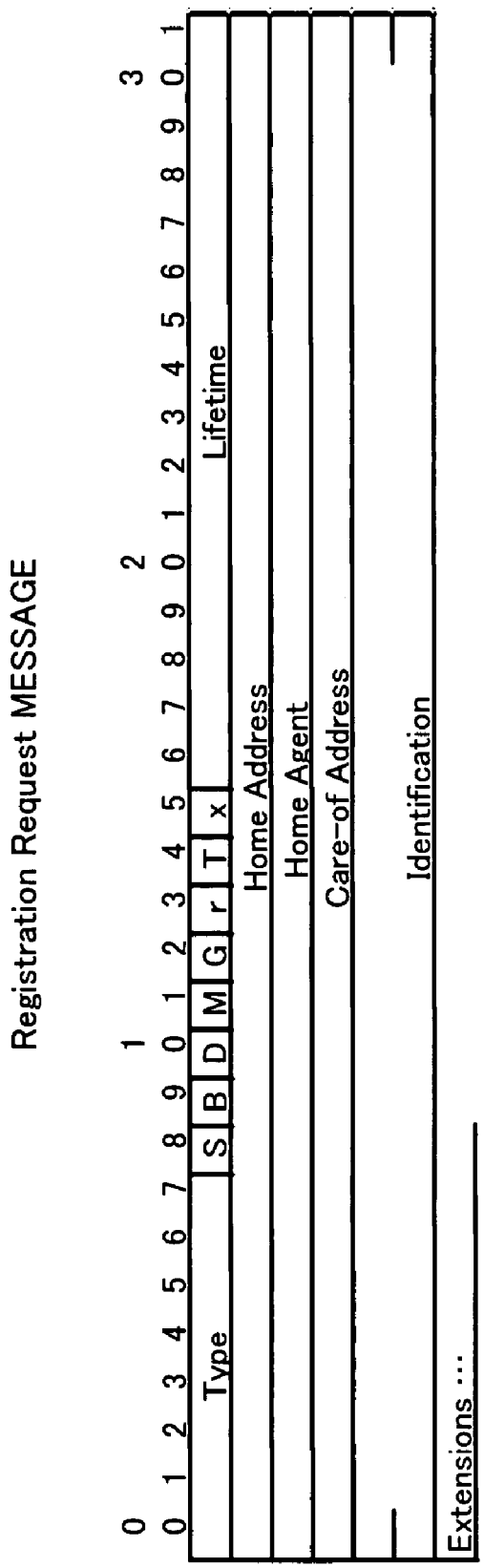
FIG. 28 shows the format of a Registration Request message.

FIG. 28 shows the format of the Registration Request message. Each field will be described below.

Type: 1 (indicates Registration Request)
S: Simultaneous coupling.
B: This bit is set when a broadcast datagram is transmitted.
D: Decapsulation at the mobile node. When this bit is set, a datagram sent to a care-of address is decapsulated at the mobile node. In other words, a shared care-of address is used.
M: Minimum capsulation. When this bit is set, the mobile node asks the home agent to dig a unidirectional tunnel.
G: GRE capsulation. When this bit is set, the mobile node asks the home agent to use GRE capsulation for a datagram dug at the mobile node as a tunnel.
r: When this bit is "0", transmission is performed. Ignored.
T: Requests a reverse tunnel.
x: When this bit is "0", transmission is performed. Ignored.
Lifetime: Effective time of registration. When this field is set to "0", it means a request of registration deletion. When this field is set to "0xffff", it means that the effective time is infinite.
Home Address: IP address of the mobile node.
Care-of Address: IP address of a tunnel end.
Identification: Identifier used for protection from attacks of repeated registration messages by pairing Registration Request messages and Registration Reply messages.
Extensions: Following the fixed part of the Registration Request message. An extension for allowing an approval is included in all Registration. Request messages.

Figure 29:
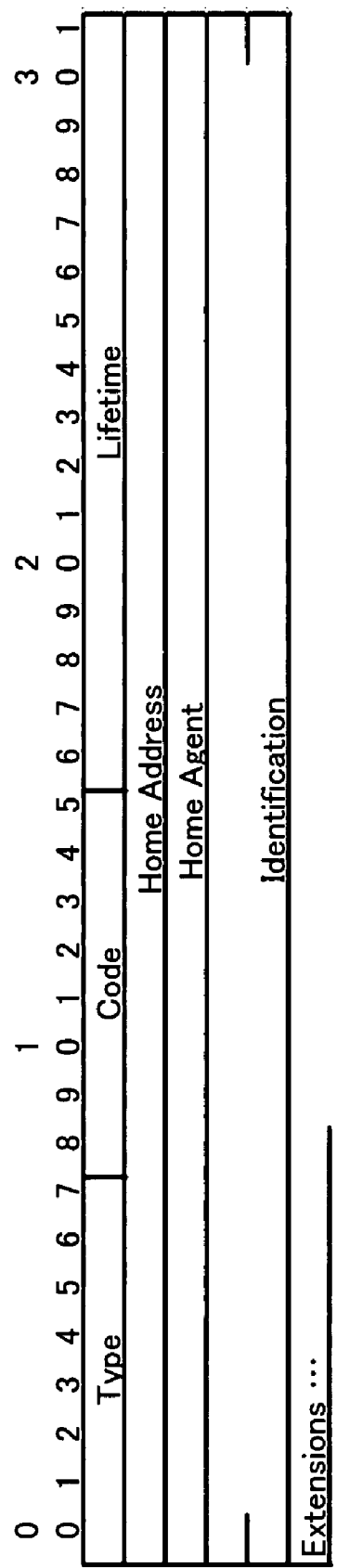
FIG. 29 shows the format of a Registration Reply message.
Figure 30:
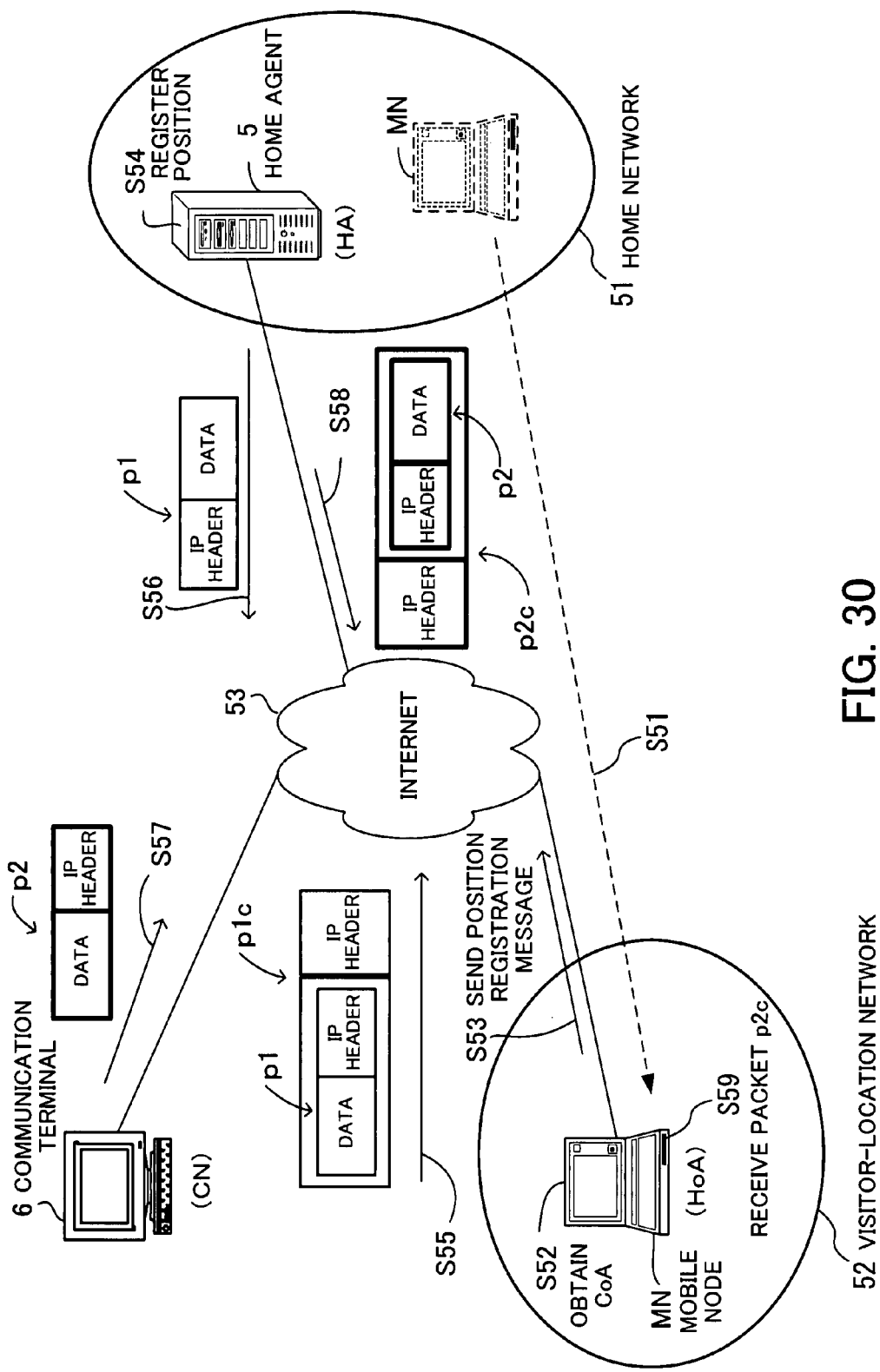
FIG. 30 shows an example structure of a Mobile-IP network.
Figure 31A:
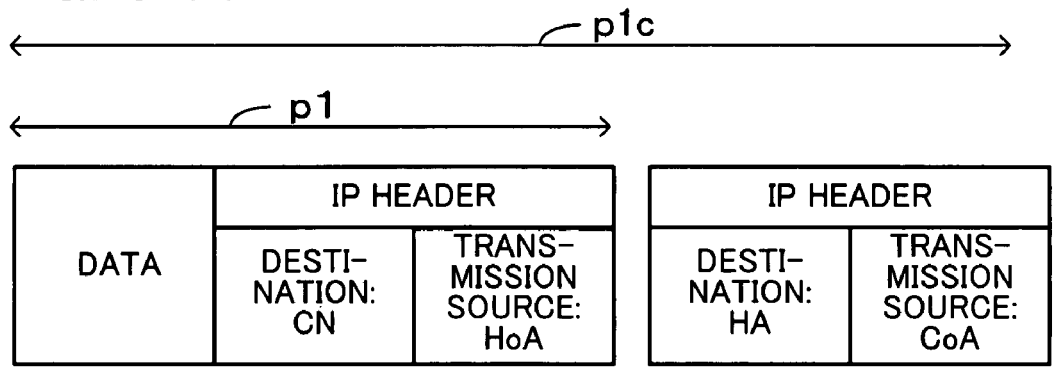
FIG. 31A shows the format of a Mobile-IP packet sent from the mobile node.
Figure 31B:
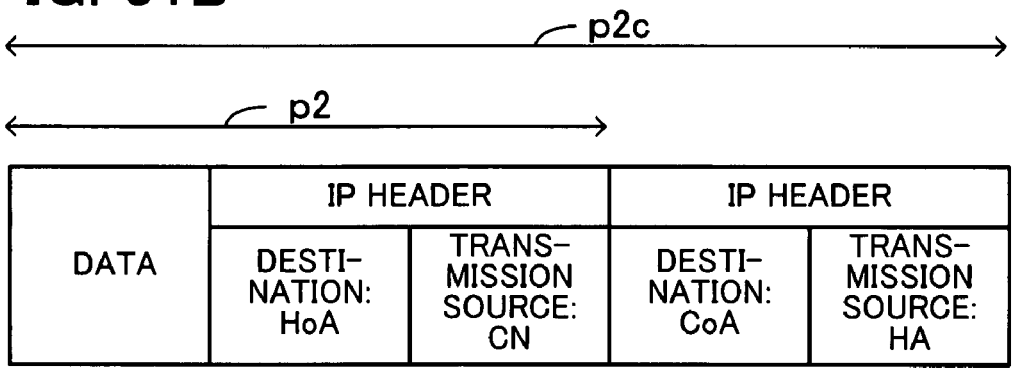
FIG. 31B shows the format of a Mobile-IP packet sent from a home agent.
Figure 32:
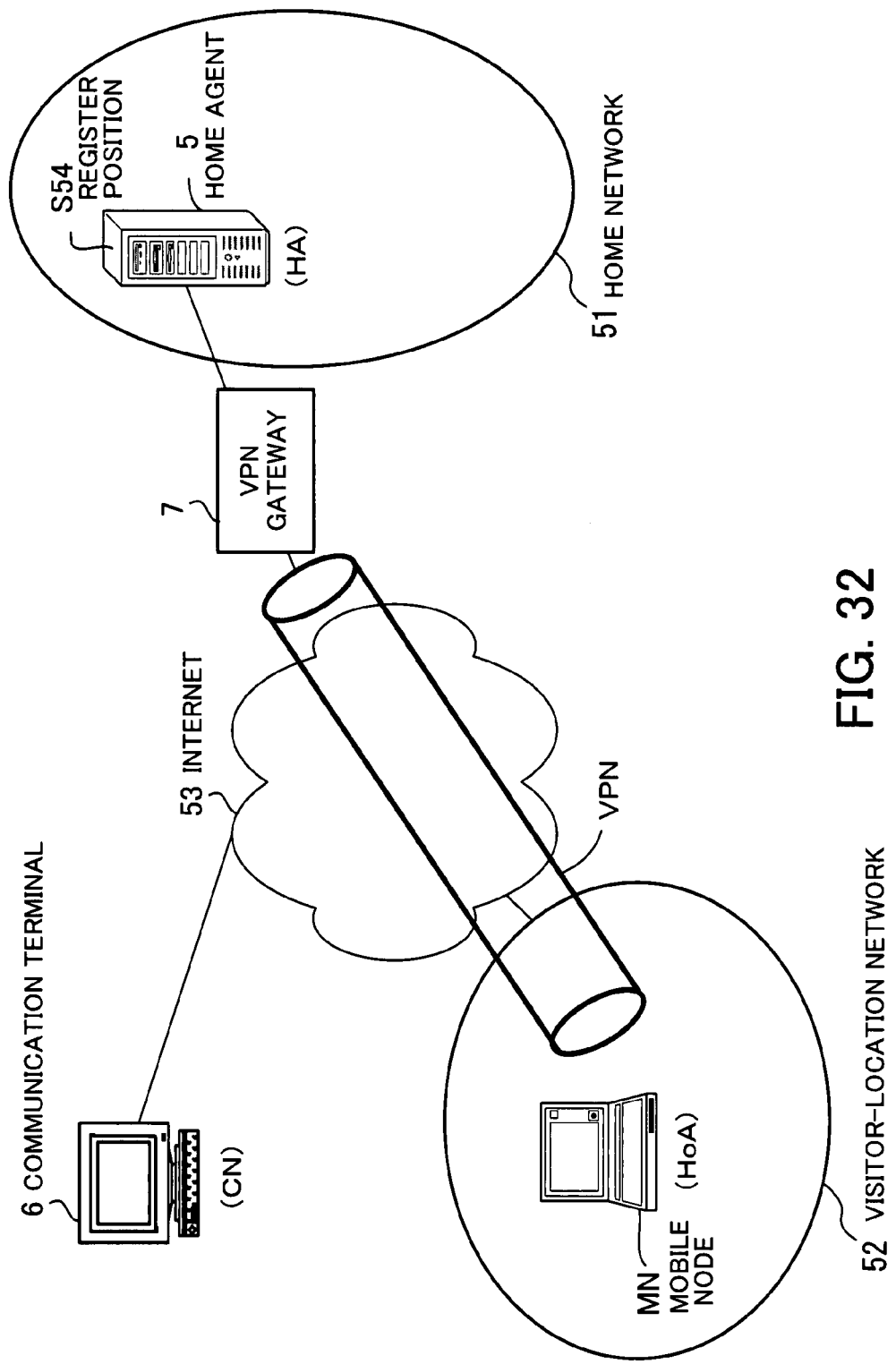
FIG. 32 shows an example structure of a mobile VPN.

FIG. 29 shows the format of the Registration Reply message. Each field will be described below.

Type: 3 (indicates Registration Reply)

Code: Value indicating the result of the Registration Request message.

Lifetime: When the Code field indicates that the registration has been accepted, this Lifetime field specifies the effective time until the registration is deleted. When this field is set to "0", it means that the registration of the mobile node has been deleted. When this field is set to "0xffff", it means that the effective time is infinite. When the Code field indicates that the registration is rejected, this Lifetime field is not specified.

Home Address: IP address of the mobile node.

Home Agent: IP address of the home agent for the mobile node.

Identification: Identifier used for protection from attacks of repeated registration messages by pairing Registration Request messages and Registration Reply messages. The value of this field is based on the Identification field of the Registration Request message sent from the mobile node and the style of the protection from attacks of repeated messages, used in a security condition between the mobile node and the home agent therefor.

Extensions: Following the fixed part of the Registration Reply message. An extension for allowing an approval is included in all Registration Reply messages.

With these messages, the home agent 21 can forward an IP packet sent from the mobile node MN to the communication terminal 6, or can forward an IP packet whose destination is the mobile node MN. When the mobile node MN completes registering the position at the home agent 21, the mobile node MN specifies MIP tunneling and an IPsec security policy and IPsec security association. For MIP tunneling, a transmission source IP address of CoA and a destination IP address of HA are specified. For an IPsec transmission security policy, a transmission source IP address of CoA, a destination IP address of HA, and IP-header omission enabled are specified.

For an IPsec receiving security policy, a transmission source IP address of HA, a destination IP address of CoA, and IP-header omission enabled are specified. According to draft-ietf-mip4-vpn-problem-solution-01, binding registration at the home agent 21 is performed by a combination of CoA and HA. Whereas PHY is changed as the mobile node MN moves, since the IP addresses CoA and HA do not change irrespective of the movement of the mobile node MN, MIP handover does not occur. An IPsec security policy is also specified by a combination of CoA and HA. Therefore, the security policy does not need to be re-arranged as the mobile node MN moves. When the mobile node MN moves, only IPsec security association, which is specified by a combination of NAT and VPNGW, needs to be updated.

The IPsec transmission security policy is used when the IP header is omitted. The IPsec receiving security policy is used when the IP header is recovered. Usually, the IPsec security association is automatically specified by IKE or other methods. With these procedures, the SAD and SPD are specified.

In the same manner as in the first embodiment, when MIP position registration is finished, security policies are specified, and security association is established, IP packets are exchanged through the VPN with their IP headers omitted, according to the present invention. RFC 3947 serves as a way to establish the security association by the use of IKE when a NAT intervenes.

Communication from a terminal in the local network 30a controlled by the mobile node MN to the communication terminal 6 will be described next. The mobile node MN performs processing corresponding to the transmission processing flow 2, and the VPN gateway GW performs processing corresponding to the forwarding processing flow 4. Even when the NAT 8 intervenes, IP-header omitting and recovering processing by using security policies according to the present invention is performed in the same way as in the first embodiment except that UDP capsulating is performed when security association is applied.

Communication from the communication terminal 6 to a terminal in the local network 30a controlled by the mobile node MN will be described next. The mobile node MN performs processing corresponding to the receiving processing flow 2, and the VPN gateway GW performs processing corresponding to the forwarding processing flow 2. Even when the NAT 8 intervenes, IP-header omitting and recovering processing by using security policies according to the present invention is performed in the same way as in the first embodiment except that UDP capsulating is performed when security association is applied.

As described above, since an IP header is omitted to change IP-header triple capsulation to double capsulation between the mobile node MN and the VPN gateway GW, the size of the IP packet to be transmitted is reduced by 20 bytes, which is the size of the IP header.

In this way, even in a network where global addresses cannot be assigned due to a lack of IP addresses, since the communication terminal 6 recognizes the mobile node MN by HoA, even when the mobile node MN moves, seamless communication is possible. Secure communication is also possible between the mobile node MN and the VPN gateway GW by a VPN using IPsec.

In a VPN using IPsec, since an IP header is omitted, network resources can be used effectively. In addition, since an IP header is omitted, encryption or authentication is applied when the IP header is omitted. Therefore, impersonation as the home agent and sniffing caused by the installation of a malicious home agent can be prevented, and sniffing and tampering of an IP packet are effectively suppressed. Since encryption and decryption are performed when a header is compressed, it is not necessary to take header compression into account. An encryption algorithm and a decryption algorithm originally supported by IPsec can be applied as is.

As described above, according to the present invention, since a Mobile-IP capsulating header is omitted between the mobile node MN and the VPN gateway, the size of data exchanged through the network can be reduced while IPsec security and Mobile-IP seamless communication are both satisfied. Network resources (mainly radio resources) can be effectively used and the network throughput of the mobile node MN can be improved.

In addition, since an IP header is omitted, the security level can be increased against sniffing and tampering of IP packets. Because the processing procedures of encryption and decryption are not changed even when header information is omitted, an encryption algorithm and a decryption algorithm originally supported by IPsec can be applied as is.

In a packet communication system according to the present invention, a packet transmission apparatus specifies the omission of header information attached when a transmission packet is capsulated, in a transmission security policy database, and, in packet transmission, adds a security header by encryption-protocol tunneling and a header for tunnel communication to a packet with the header information being omitted and sends the packet; and, in packet reception, a packet receiving apparatus recovers the header information omitted, according to a receiving security policy database.

Therefore, while security and seamless communication are both satisfied, a redundant header of a packet can be omitted in mobile-VPN communication. Network resources can be effectively used and network operability can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet communication system for performing packet communication, comprising:
    a packet transmission apparatus; and
    a packet receiving apparatus,
    the packet transmission apparatus comprising:
        a transmission security policy database to store a security policy indicating a level of protection applied to a packet, and to specify the omission of header information attached when a transmission packet is capsulated, as a transmission security policy for omitting redundant information;
        a header-information omitting section to search the transmission security policy database at packet transmission for a security policy for a capsulated transmission packet, and, when recognizing that the capsulated transmission packet is a target packet from which the header information is to be omitted, to omit the header information from the target packet; and
        a packet transmission processing section to add a security header by tunneling in an encryption protocol and a header for tunnel communication to the packet from which the header information has been omitted, and to apply transmission processing to the packet changed from a triple header capsulation to a double header capsulation, and
    the packet receiving apparatus comprising:
        a receiving security policy database to specify the header information, which is to be recovered, as a receiving security policy; and
        a header-information recovering section to search the receiving security policy database at packet reception for a security policy for a received packet, and, when recognizing that the received packet is a target packet from which the header information has been omitted, to recover the header information, and to change from the double header capsulation to the triple header capsulation.

2. The packet communication system according to claim 1, wherein the header-information omitting section omits the header information before security association in the encryption protocol is applied; and
    the header-information recovering section recovers the header information after the security association is released.

3. The packet communication system according to claim 1, wherein the transmission security policy database specifies the omission of header information attached when the original packet is capsulated in Mobile-IP communication;
    the receiving security policy database specifies the recovery of the header information, omitted at a transmission side by capsulation in Mobile-IP communication; and
    the packet transmission processing section adds a header by IPsec tunneling to the packet from which the header information has been omitted.

4. The packet communication system according to claim 3, wherein, when the packet transmission apparatus is moved from a home network to a visitor-location network, and the packet receiving apparatus is installed at a point where a communication path with the packet transmission apparatus is to be encrypted,
    the transmission security policy database specifies, as the transmission security policy, the omission of header information that includes a care-of address of the packet transmission apparatus in the visitor-location network as a transmission source address and an address of a home agent for managing the position of the packet transmission apparatus as a destination address; and
    the receiving security policy database specifies, as the receiving security policy, that the header information has been omitted.

5. The packet communication system according to claim 3, wherein, when the packet receiving apparatus is moved from a home network to a visitor-location network, and the packet transmission apparatus is installed at a point where a communication path with the packet receiving apparatus is to be encrypted,
    the transmission security policy database specifies, as the transmission security policy, the omission of header information that includes an address of a home agent for managing the position of the packet receiving apparatus as a transmission source address and a care-of address of the packet receiving apparatus in the visitor-location network as a destination address; and
    the receiving security policy database specifies, as the receiving security policy, that the header information has been omitted.

6. A packet communication apparatus for performing packet communication, comprising:
    a security policy database to store a security policy indicating a level of protection applied to a packet, and to specify the omission of header information attached when a transmission packet is capsulated, as a transmission security policy for omitting redundant information, and specifying the header information, which is to be recovered, as a receiving security policy;
    a header-information omitting section to search the security policy database at packet transmission for a security policy for a capsulated transmission packet, and, when recognizing that the capsulated transmission packet is a target packet from which the header information is to be omitted, to omit the header information from the target packet;
    a packet transmission processing section to add a security header by tunneling in an encryption protocol and a header for tunnel communication to the packet from which the header information has been omitted, and to apply transmission processing to the packet changed from a triple header capsulation to a double header capsulation; and
    a header-information recovering section to search the security policy database at packet reception for a security policy for a received packet, and, when recognizing that the received packet is a target packet from which the header information has been omitted, to recover the header information, and to change from the double header capsulation to the triple header capsulation.

7. A packet communication method for performing packet communication,
- a packet transmission apparatus comprising a transmission security policy database for storing a security policy indicating a level of protection applied to a packet, specifying the omission of header information attached when a transmission packet is capsulated, as a transmission security policy for omitting redundant information, and
- a packet receiving apparatus comprising a receiving security policy database specifying the header information, which is to be recovered, as a receiving security policy, the packet communication method comprising:
- the packet transmission apparatus searching the transmission security policy database for a security policy for a capsulated transmission packet, and, when recognizing that the capsulated transmission packet is a target packet from which the header information is to be omitted, omitting the header information from the target packet;
- the packet transmission apparatus adding a security header by tunneling in an encryption protocol and a header for tunnel communication to the packet from which the header information has been omitted, and transmitting the packet changed from a triple header capsulation to a double header capsulation; and
- the packet receiving apparatus searching the receiving security policy database for a security policy for a received packet, and, when recognizing that the received packet is a target packet from which the header information has been omitted, recovering the header information and changing from the double header capsulation to the triple header capsulation.

8. The packet communication method according to claim 7, wherein the header information is omitted before security association in the encryption protocol is applied; and
the header information is recovered after the security association is released.

9. The packet communication method according to claim 7, wherein the transmission security policy database specifies the omission of header information attached when the original packet is capsulated in Mobile-IP communication;
the receiving security policy database specifies the recovery of the header information, omitted at a transmission side by capsulation in Mobile-IP communication; and
the packet transmission processing section adds a header by IPsec tunneling to the packet from which the header information has been omitted.

10. The packet communication method according to claim 9, wherein, when the packet transmission apparatus is moved from a home network to a visitor-location network, and the packet receiving apparatus is installed at a point where a communication path with the packet transmission apparatus is to be encrypted,
- the transmission security policy database specifies, as the transmission security policy, the omission of header information that includes a care-of address of the packet transmission apparatus in the visitor-location network as a transmission source address and an address of a home agent for managing the position of the packet transmission apparatus as a destination address; and
- the receiving security policy database specifies, as the receiving security policy, that the header information has been omitted.

11. The packet communication method according to claim 9, wherein, when the packet receiving apparatus is moved from a home network to a visitor-location network, and the packet transmission apparatus is installed at a point where a communication path with the packet receiving apparatus is to be encrypted,
- the transmission security policy database specifies, as the transmission security policy, the omission of header information that includes an address of a home agent for managing the position of the packet receiving apparatus as a transmission source address and a care-of address of the packet receiving apparatus in the visitor-location network as a destination address; and
- the receiving security policy database specifies, as the receiving security policy, that the header information has been omitted.

* * * * *

UNITED STATES PATENT AND TRADEMARK OFFICE
CERTIFICATE OF CORRECTION

PATENT NO. : 7,861,080 B2  Page 1 of 1
APPLICATION NO. : 11/700782
DATED : December 28, 2010
INVENTOR(S) : Hiroshi Wakameda It is certified that error appears in the above-identified patent and that said Letters Patent is hereby corrected as shown below:

Title page, item (73) Assignee: Fujitisu Limited should read --Fujitsu Limited--.

Signed and Sealed this
Twentieth Day of September, 2011

David J. Kappos
*Director of the United States Patent and Trademark Office*